United States Patent
Saitoh et al.

(10) Patent No.: US 8,808,134 B2
(45) Date of Patent: *Aug. 19, 2014

(54) AUTOMATIC TRANSMISSION

(75) Inventors: Noriaki Saitoh, Wako (JP); Soichi Sugino, Wako (JP); Toshikazu Kouno, Wako (JP); Kohei Iizuka, Wako (JP); Mariko Shibamura, Wako (JP); Shoji Machida, Wako (JP); Jorg Muller, Chemnitz (DE); Rico Resch, Wilsdruff (DE); Mirko Leesch, Thum (DE)

(73) Assignee: Honda Motor Co., Ltd., Tokyo (JP)

( * ) Notice: Subject to any disclaimer, the term of this patent is extended or adjusted under 35 U.S.C. 154(b) by 338 days.

This patent is subject to a terminal disclaimer.

(21) Appl. No.: 13/281,442

(22) Filed: Oct. 26, 2011

(65) Prior Publication Data

US 2012/0108382 A1    May 3, 2012

(30) Foreign Application Priority Data

Nov. 2, 2010    (JP) ................. 2010-246214

(51) Int. Cl.
*F16H 3/62* (2006.01)
*F16H 3/66* (2006.01)

(52) U.S. Cl.
CPC .................. *F16H 3/66* (2013.01); *F16H 3/663* (2013.01); *F16H 2200/0065* (2013.01); *F16H 2200/2012* (2013.01); *F16H 2200/2048* (2013.01); *Y10S 475/903* (2013.01)
USPC ........... 475/276; 475/271; 475/275; 475/280; 475/281; 475/282; 475/284; 475/286; 475/287; 475/290; 475/291; 475/297; 475/903

(58) Field of Classification Search
CPC ........... F16H 3/66; F16H 3/663; F16H 3/666; F16H 2200/0065; F16H 2200/2012
USPC ........................................... 475/476
See application file for complete search history.

(56) References Cited

U.S. PATENT DOCUMENTS

| | | | |
|---|---|---|---|
| 7,632,206 B2 * | 12/2009 | Gumpoltsberger | 475/275 |
| 7,824,302 B2 | 11/2010 | Diosi et al. | |
| 8,398,522 B2 | 3/2013 | Bauknecht et al. | |

FOREIGN PATENT DOCUMENTS

| | | |
|---|---|---|
| JP | 2000-161450 | 6/2000 |
| JP | 2001-182785 | 7/2001 |
| JP | 2002-323098 | 11/2002 |
| JP | 2005-273768 | 10/2005 |
| JP | 2006-089002 | 4/2006 |

(Continued)

OTHER PUBLICATIONS

Japanese Office Action for corresponding JP Application No. 2010-246214, Nov. 14, 2012.

(Continued)

*Primary Examiner* — Edwin A Young
*Assistant Examiner* — Colby M Hansen
(74) *Attorney, Agent, or Firm* — Mori & Ward, LLP

(57) ABSTRACT

An automatic transmission includes an input shaft, an output member, a first planetary gear system, a second planetary gear system, a third planetary gear system, a fourth planetary gear system, and an engagement mechanism. The input shaft is configured to be rotated with power of a driving source relative to the transmission case. The output member is to output rotation of the input shaft using multiple gear-shifting. The multiple gear-shifting is provided by setting at least three of first to third clutches and first to third brakes in a connection state.

10 Claims, 9 Drawing Sheets

(56) References Cited

FOREIGN PATENT DOCUMENTS

| | | |
|---|---|---|
| JP | 2008-534873 | 8/2008 |
| JP | 2009-085433 | 4/2009 |
| JP | 2009-293762 | 12/2009 |
| JP | 2010-203462 | 9/2010 |
| JP | 2011-513662 | 4/2011 |

OTHER PUBLICATIONS

Japanese Arguments for corresponding JP Application No. 2010-246214, Jan. 21, 2013.

Japanese Amendments for corresponding JP Application No. 2010-246214, Jan. 21, 2013.

* cited by examiner

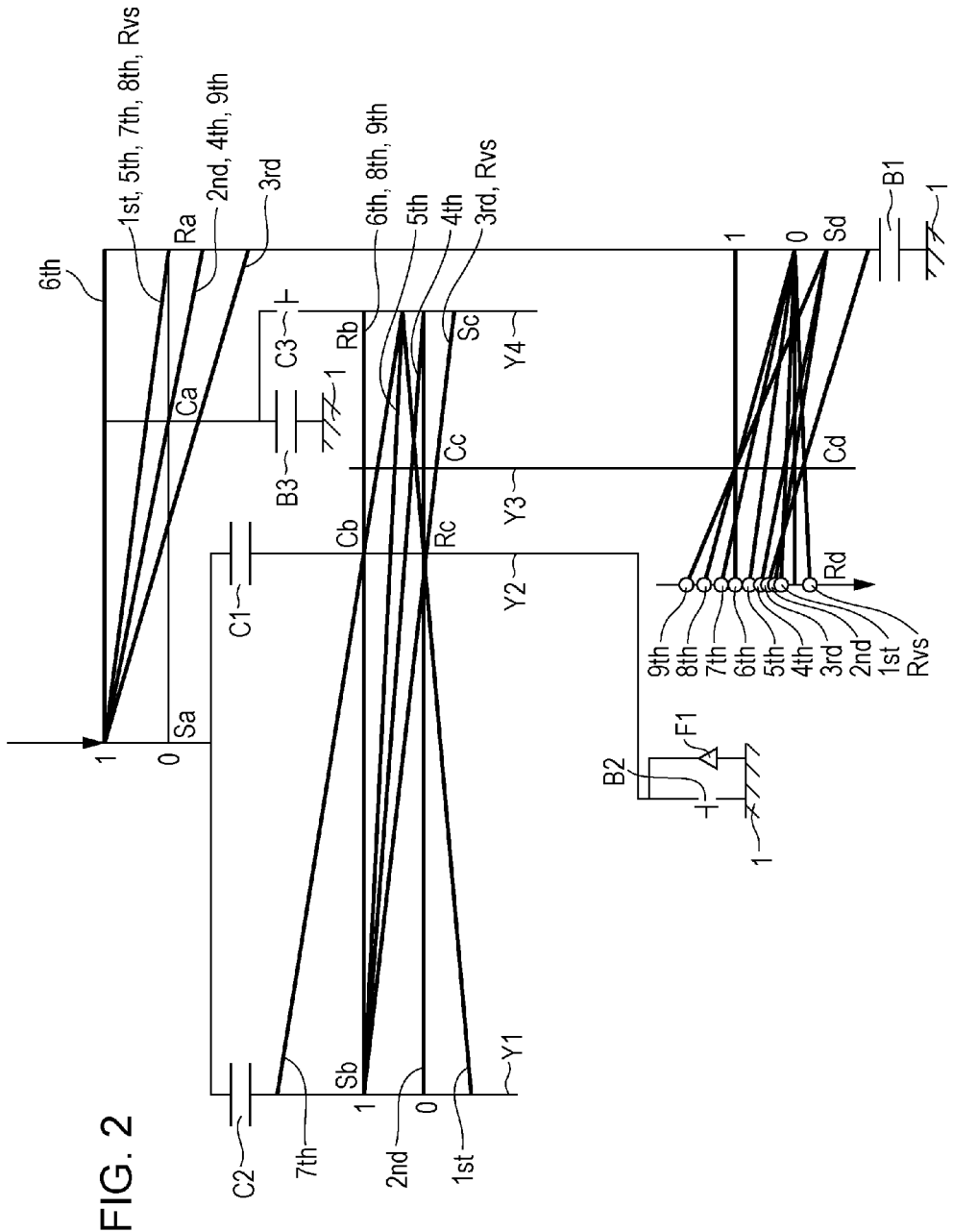

FIG. 3A

|     | B1 | B2  | B3 | C1 | C2 | C3 | F1 |
|-----|----|-----|----|----|----|----|----|
| Rvs | O  | O   |    |    | O  |    |    |
| 1st | O  | (O) |    |    |    | O  | O  |
| 2nd |    | (O) | O  |    |    | O  | O  |
| 3rd |    | (O) |    |    | O  | O  | O  |
| 4th |    |     | O  |    | O  | O  |    |
| 5th | O  |     |    |    | O  | O  |    |
| 6th |    |     |    | O  | O  | O  |    |
| 7th | O  |     |    | O  |    | O  |    |
| 8th | O  |     |    | O  | O  |    |    |
| 9th |    |     | O  | O  | O  |    |    |

FIG. 3B

|     | GEAR RATIO |
|-----|------------|
| Rvs | 3.989      |
| 1st | 5.147      |
| 2nd | 3.380      |
| 3rd | 2.342      |
| 4th | 1.656      |
| 5th | 1.349      |
| 6th | 1.000      |
| 7th | 0.839      |
| 8th | 0.642      |
| 9th | 0.539      |

FIG. 3C

|     | COMMON RATIO |
|-----|--------------|
| 1-2 | 1.523        |
| 2-3 | 1.443        |
| 3-4 | 1.415        |
| 4-5 | 1.227        |
| 5-6 | 1.349        |
| 6-7 | 1.191        |
| 7-8 | 1.307        |
| 8-9 | 1.190        |

FIG. 3D

| GEAR RATIO h | 1.885 |
|--------------|-------|
| GEAR RATIO i | 2.236 |
| GEAR RATIO j | 1.779 |
| GEAR RATIO k | 1.793 |
| RATIO RANGE  | 9.540 |

FIG. 7A

|      | B1 | B2  | B3 | C1 | C2 | C3 | F1 |
|------|----|-----|----|----|----|----|----|
| Rvs  | ○  | ○   |    |    | ○  |    |    |
| 1st  | ○  | (○) |    |    |    | ○  | ○  |
| 2nd  |    | (○) | ○  |    |    | ○  | ○  |
| 3rd  |    | (○) |    |    | ○  | ○  | ○  |
| 4th  |    |     | ○  |    | ○  | ○  |    |
| 5th  | ○  |     |    |    | ○  | ○  |    |
| 6th  |    |     |    | ○  | ○  | ○  |    |
| 7th  | ○  |     |    | ○  |    | ○  |    |
| 8th  | ○  |     |    | ○  | ○  |    |    |
| 9th  |    |     | ○  | ○  | ○  |    |    |

FIG. 7B

|      | GEAR RATIO |
|------|------------|
| Rvs  | 3.965      |
| 1st  | 5.126      |
| 2nd  | 3.371      |
| 3rd  | 2.337      |
| 4th  | 1.652      |
| 5th  | 1.347      |
| 6th  | 1.000      |
| 7th  | 0.840      |
| 8th  | 0.642      |
| 9th  | 0.539      |

FIG. 7C

|     | COMMON RATIO |
|-----|--------------|
| 1-2 | 1.521        |
| 2-3 | 1.443        |
| 3-4 | 1.414        |
| 4-5 | 1.227        |
| 5-6 | 1.347        |
| 6-7 | 1.191        |
| 7-8 | 1.308        |
| 8-9 | 1.190        |

FIG. 7D

| GEAR RATIO h | 1.879 |
|--------------|-------|
| GEAR RATIO i | 2.227 |
| GEAR RATIO j | 1.773 |
| GEAR RATIO k | 1.794 |
| RATIO RANGE  | 9.504 |

AUTOMATIC TRANSMISSION

CROSS-REFERENCE TO RELATED APPLICATIONS

The present application claims priority under 35 U.S.C. §119 to Japanese Patent Application No. 2010-246214 filed Nov. 2, 2010, entitled "Automatic Transmission". The contents of this application are incorporated herein by reference in their entirety.

BACKGROUND OF THE INVENTION

1. Field of the Invention

The present invention relates to an automatic transmission.

2. Discussion of the Background

There is a known automatic transmission capable of forward 8-speed transmission by using a first planetary gear system for input, second and third planetary gear systems for transmission, and six engagement mechanisms (for example, refer to Japanese Unexamined Patent Application Publication No. 2005-273768).

According to Japanese Unexamined Patent Application Publication No. 2005-273768, the first planetary gear system is a double-pinion planetary gear system and includes a first sun gear, a first ring gear, and a first carrier, which supports paired first pinions engaging with each other and engaging with the first sun gear and the first ring gear in such manner that the first pinions freely rotate and orbit. The first planetary gear system is also known as a "plus planetary gear system" or a "positive planetary gear system" because, when the carrier is fixed, the sun gear and the ring gear rotate in the same direction. When the ring gear is fixed, the sun gear and the carrier rotate in the different directions.

In the first planetary gear system, the first sun gear is a fixed element, which is fixed to the transmission case, the first carrier is an input element connected to an input shaft, and the first ring gear is an output element, which reduces the rotational speed of the first carrier and outputs the reduced rotational force.

The two planetary gear systems for transmission are each a Ravigneaux-type planetary gear system, which includes a second sun gear, a third sun gear, a second ring gear integrated with a third ring gear, and a second carrier, which supports paired second pinions engaging with each other, one of which engaging with the second sun gear and the second ring gear and the other engaging with third sun gear and the third ring gear, in such manner that the second pinions freely rotate and orbit.

According to a collinear diagram of the Ravigneaux-type planetary gear system (in which the ratios of the relative rotational speeds of different elements are represented by straight lines), if the elements are defined as a first rotary element, a second rotary element, a third rotary element, and a fourth rotary element on the basis of the distances thereof corresponding to the gear ratios, the first rotary element is the second sun gear, the second rotary element is the second carrier integrated with the third carrier, the third rotary element is the second ring gear integrated with the third ring gear, and the fourth rotary element is the third sun gear.

The automatic transmission includes engagement mechanisms: a first wet multi-disc clutch, which freely connects and disconnects the first ring gear, which is the output element of the first planetary gear system, and the fourth rotary element, which is the third sun gear; a second wet multi-disc clutch, which freely connects and disconnects the input shaft and the second rotary element, which is the second carrier; a third wet multi-disc clutch, which freely connects and disconnects the first ring gear, which is the output element, and the first rotary element, which is the second sun gear; a fourth wet multi-disc clutch, which freely connects and disconnects the first carrier, which is the input element, and the first rotary element, which is second sun gear; and a first brake, which freely fixes and detaches the first rotary element, which is the second sun gear, to the transmission case; and a second brake, which freely fixes and detaches the second rotary element, which is the second carrier, to the transmission box.

With the configuration described above, first gear is established by engaging the first wet multi-disc clutch and the second brake; second gear is established by engaging the first wet multi-disc clutch and the first brake; third gear is established by engaging the first wet multi-disc clutch and the third wet multi-disc clutch; and fourth gear is established by engaging the first wet multi-disc clutch and the fourth wet multi-disc clutch.

Fifth gear is established by engaging the first wet multi-disc clutch and the second wet multi-disc clutch; sixth gear is established by engaging the second wet multi-disc clutch and the fourth wet multi-disc clutch; seventh gear is established by engaging the second wet multi-disc clutch and the third wet multi-disc clutch; and eighth gear is established by engaging the second wet multi-disc clutch and the first brake.

A known automatic transmission has eight columns aligned with the axis of the input shaft. Specifically, in order from the torque converter side, the first column is the fourth clutch and the first brake; the second column is the first planetary gear system; the third column is the first clutch; the fourth column is the third clutch (although the third clutch is illustrated in the same column as the first planetary gear system in a skeleton diagram, actually, a piston and an oil passage for the third clutch are interposed between the first clutch and the output gear); the fifth column is the output gear; the sixth column is the second planetary gear system; the seventh column is the third planetary gear system; and the eighth column is the second clutch and the second brake.

SUMMARY OF THE INVENTION

According to one aspect of the present invention, an automatic transmission comprises an input shaft, an output member, a first planetary gear system, a second planetary gear system, a third planetary gear system, a fourth planetary gear system, and an engagement mechanism. The input shaft is rotatably arranged relative to a transmission case and is configured to be rotated with power of a driving source relative to the transmission case. The output member is to output rotation of the input shaft using multiple gear-shifting. The first planetary gear system includs a first sun gear, a first carrier, and a first ring gear. The second planetary gear system includes a second sun gear, a second carrier, and a second ring gear. The third planetary gear system includes a third sun gear, a third carrier, and a third ring gear. The fourth planetary gear system includes a fourth sun gear, a fourth carrier, and a fourth ring gear. Four elements of the second sun gear, the second carrier, the second ring gear, the third sun gear, the third carrier, and the third ring gear are defined as a first rotary element, a second rotary element, a third rotary element, and a fourth rotary element based on an alignment order in a collinear diagram illustrating ratios of relative rotational speeds of the first to fourth rotary elements as straight lines. The first sun gear, the first carrier, and the first ring gear is defined as a first element, a second element, and a third element based on an alignment order in accordance with distances corresponding to gear ratios in a collinear diagram illustrating ratios of relative rotational speeds of the first to third elements as straight lines. The fourth sun gear, the fourth carrier, and the fourth ring gear is defined as a fourth element, a fifth element, and a sixth element based on an alignment order in accordance with distances corresponding to gear ratios in a collinear diagram. The first element is connected to the input shaft. The fourth element is connected to the output member. The third element and the sixth element are connected to each other to provide a first connected body. The third rotary element and the fifth element are connected to each other to provide a second connected body. The engagement mechanism comprises a first clutch, a second clutch, a third clutch, a first brake, a second brake, and a third brake. The first clutch is configured to releasably connect the first element to the second rotary element. The second clutch is configured to releasably connect the first element to the first rotary element. The third clutch is configured to releasably connect the second element to the fourth rotary element. The first brake is configured to releasably connect the first connected body to the transmission case. The second brake is configured to releasably connect the second rotary element to the transmission case. The third brake is configured to releasably connect the second element to the transmission case. The multiple gear-shifting is provided by setting at least three of the first to third clutches and the first to third brakes in a connection state.

According to another aspect of the present invention, an automatic transmission comprises an input shaft, an output member, a first planetary gear system, a second planetary gear system, a third planetary gear system, a fourth planetary gear system, and an engagement mechanism. The input shaft is rotatably arranged relative to a transmission case and is configured to be rotated with power of a driving source relative to the transmission case. The output member is configured to output rotation of the input shaft using multiple gear-shifting. The first planetary gear system includes a first sun gear, a first carrier, and a first ring gear. The second planetary gear system includes a second sun gear, a second carrier, and a second ring gear. The third planetary gear system includes a third sun gear, a third carrier, and a third ring gear. The fourth planetary gear system includes a fourth sun gear, a fourth carrier, and a fourth ring gear. The first sun gear, the first carrier, and the first ring gear are defined as a first element, a second element, and a third element based on an alignment order in accordance with distances corresponding to gear ratios in a collinear diagram illustrating ratios of relative rotational speeds of the first to third elements as straight lines. The second sun gear, the second carrier, and the second ring gear are defined as a fourth element, a fifth element, and a sixth element based on an alignment order in accordance with distances corresponding to gear ratios in a collinear diagram illustrating ratios of relative rotational speeds of the fourth to sixth elements as straight lines. The third sun gear, the third carrier, and the third ring gear are defined as a seventh element, an eighth element, and a ninth element based on an alignment order in accordance with distances corresponding to gear ratios in a collinear diagram illustrating ratios of relative rotational speeds of the seventh to ninth elements as straight lines. The fourth sun gear, the fourth carrier, and the fourth ring gear are defined as a tenth element, an eleventh element, and a twelfth element based on an alignment order in accordance with distances corresponding to gear ratios in a collinear diagram illustrating ratios of relative rotational speeds of the tenth to twelfth elements as straight lines. The third element and the twelfth element are connected to each other to provide a first connected body. The eighth element and the fourth element are connected to each other to provide a second connected body. The first element and the fourth element are connected to each other to provide a third connected body. The sixth element and the ninth element are connected to each other to provide a fourth connected body. The third connected body is connected to the input shaft. The tenth element is connected to the output member. The engagement mechanism comprises a first clutch, a second clutch, a third clutch, a first brake, a second brake, and a third brake. The first clutch is configured to connect the seventh element to the third connected body. The second clutch is configured to releasably connect the fifth element to the seventh element. The third clutch is configured to releasably connect the second element to the fourth connected body. The first brake is configured to releasably connect the first connected body to the transmission case. The second brake is configured to releasably connect the seventh element to the transmission case. The third brake is configured to releasably connect the second element to the transmission case. The multiple gear-shifting is provided by setting at least three of the first to third clutches and the first to third brakes in a connection state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 2 is a collinear diagram illustrating the ratios of the relative rotational speeds of elements in first to fourth planetary gear systems of the automatic transmission according to the first embodiment.

FIG. 3A illustrates the states of engagement mechanisms of an automatic transmission according to the first embodiment in each gear.

FIG. 3B illustrates an example of gear ratios of the gears in the first embodiment.

FIG. 3C illustrates an example of common ratios of gears in the first embodiment.

FIG. 3D illustrates an example of gear ratios of planetary gear systems in the first embodiment and ratio ranges of gears of an automatic transmission.

FIG. 7A illustrates the states of engagement mechanisms of an automatic transmission according to the third embodiment in each gear.

FIG. 7B illustrates an example of gear ratios of the gears in the third embodiment.

FIG. 7C illustrates an example of common ratios of gears in the third embodiment.

FIG. 7D illustrates an example of gear ratios of planetary gear systems in the third embodiment and ratio ranges of gears of an automatic transmission.

DESCRIPTION OF THE EMBODIMENTS

Figure 1:
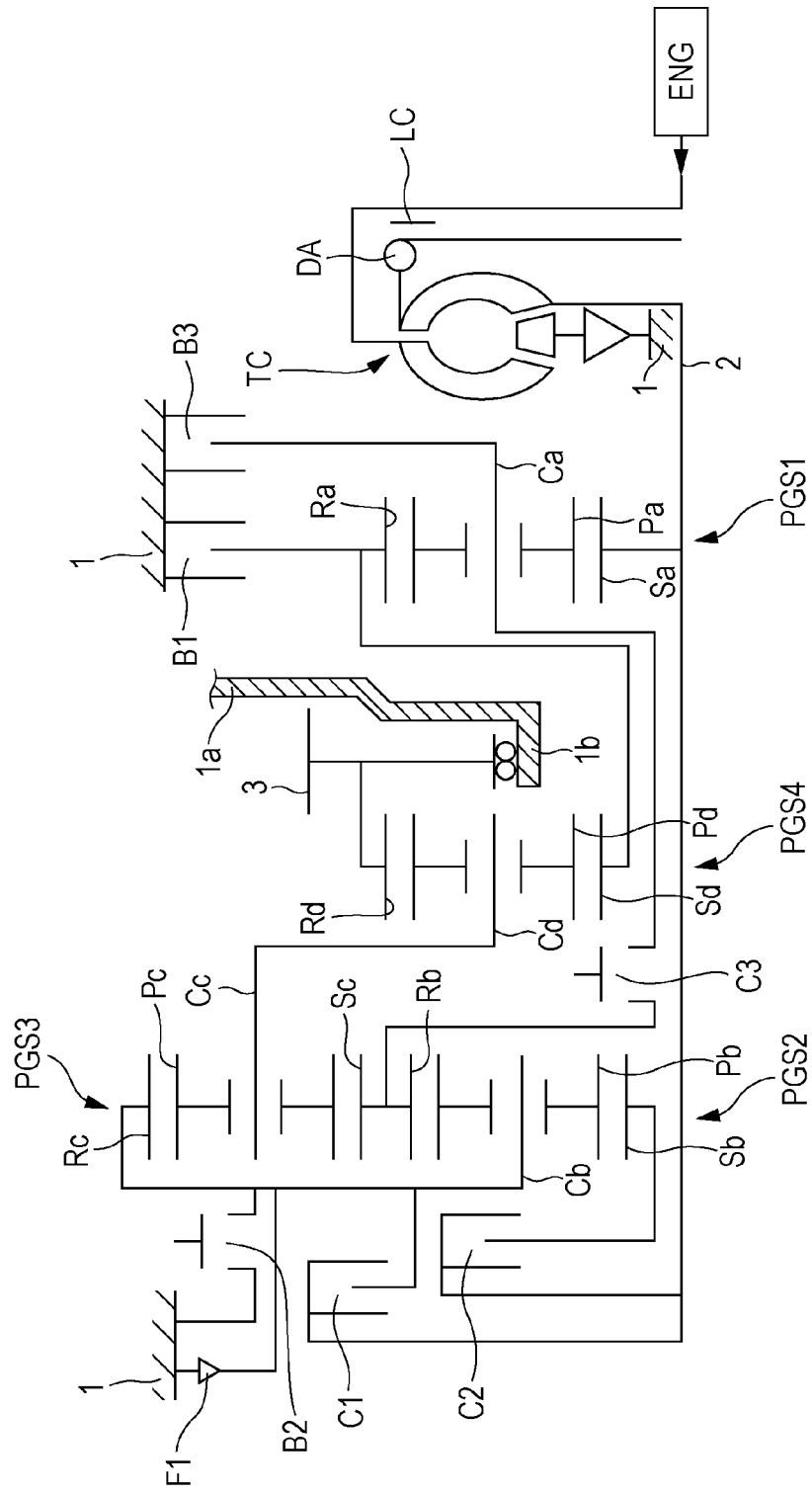
FIG. 1 is a skeleton diagram of the top half of an automatic transmission according to a first embodiment of a first aspect of the present invention.

The embodiments will now be described with reference to the accompanying drawings, wherein like reference numerals designate corresponding or identical elements throughout the various drawings.

First Embodiment

FIG. 1 illustrates an automatic transmission according to a first embodiment of a first aspect of the present invention. The automatic transmission according to the first embodiment includes an input shaft 2 and output member 3; the input shaft 2 is supported inside a transmission case 1 in such a manner that the input shaft 2 freely rotates and receives a driving force output from a driving source ENG, such as an engine, via a torque converter TC, which includes a lockup clutch LC and a damper DA; and the output member 3 includes an output gear disposed concentrically with the input shaft 2. The rotation of the output member 3 is transmitted to the left and right drive wheels of a vehicle via a differential gear and a propeller shaft, which are not shown in the drawing. Instead of the torque converter TC, a single-disc or multi-disc starting clutch, which is capable of frictional engagement, may be provided.

Inside the transmission case 1, first to fourth planetary gear systems PGS1 to PGS4 are disposed concentrically with the input shaft 2.

The first planetary gear system PGS1 is a single-pinion planetary gear system and includes a sun gear Sa, a ring gear Ra, and a carrier Ca, which supports a pinion Pa engaged with the sun gear Sa and the ring gear Ra in such manner that the pinion Pa freely rotates and orbits. The first planetary gear system PGS1 is also known as "minus planetary gear system" or "negative planetary gear system" because, when the carrier Ca is fixed, the sun gear Sa and the ring gear Ra rotate in different directions. When the ring gear Ra is fixed, the sun gear Sa and the carrier Ca rotate in the same direction.

With reference to the collinear diagram of the first planetary gear system PGS1, which is illustrated at the top of FIG. 2 (in which the ratios of the relative rotational speeds of the three elements Sa, Ca, and Ra are represented by straight lines (speed lines)), if the three elements Sa, Ca, and Ra of the first planetary gear system PGS1 are respectively defined as first, second, and third elements on the basis of the distances thereof from the left of the collinear diagram, which corresponds to the gear ratios, the first element is the sun gear Sa, the second element is the carrier Ca, and the third element is the ring gear Ra. The ratio of the distance between the sun gear Sa and the carrier Ca to the distance between the carrier Ca and the ring gear Ra is set to h:1, where h represents the gear ratio (number of ring gear teeth/number of sun gear teeth) of the first planetary gear system PGS1.

In the collinear diagram of the first planetary gear system PGS1, the lower transverse line represents a rotational speed of zero, and the upper transverse line represents a rotational speed of "1", which is same as the rotational speed of the input shaft being normalized to "1".

The second planetary gear system PGS2 is also a single-pinion planetary gear system and includes a sun gear Sb, a ring gear Rb, and a carrier Cb, which supports the pinion Pb engaged with the sun gear Sb and the ring gear Rb in such manner that the pinion Pb freely rotates and orbits.

The third planetary gear system PGS3 is also a single-pinion planetary gear system and includes a sun gear Sc, a ring gear Rc, and a carrier Cc, which supports the a pinion Pc engaged with the sun gear Sc and the ring gear Rc in such manner that the pinion Pc freely rotates and orbits.

Two of the three elements of the second planetary gear system PGS2 are connected to two of the three elements of the third planetary gear system PGS3, i.e., two of the sun gear Sb, the ring gear Rb, and the carrier Cb of the second planetary gear system PGS2 are connected to two of the sun gear Sc, the ring gear Rc, and the carrier Cc of the third planetary gear system PGS3, so as to constitute four different rotary elements. With reference to a collinear diagram of the second planetary gear system PGS2 and the third planetary gear system PGS3 at the middle of FIG. 2 (in which the ratios of the relative rotational speeds of the four rotary elements are represented by straight lines (speed lines)), if the rotary elements are defined as a first rotary element Y1, a second rotary element Y2, a third rotary element Y3, and a fourth rotary element Y4 on the basis of the distances thereof from the left of the collinear diagram, the first rotary element Y1 is the sun gear Sb of the second planetary gear system PGS2, the second rotary element Y2 is a connected body of the carrier Cb of the second planetary gear system PGS2 and the ring gear Rc of the third planetary gear system PGS3, the third rotary element Y3 is the carrier Cc of the third planetary gear system PGS3, and the fourth rotary element Y4 is a connected body of the ring gear Rb of the second planetary gear system PGS2 and the sun gear Sc of the third planetary gear system PGS3.

In the collinear diagram of the second planetary gear system PGS2 and the third planetary gear system PGS3, the lower transverse line represents a rotational speed of zero, and the upper transverse line represents a rotational speed of "1", which is same as the rotational speed of the input shaft being normalized to "1".

When the gear ratio of the second planetary gear system PGS2 is i, and the gear ratio of the third planetary gear system PGS3 is j, the distances between the first to fourth rotary elements are set at a proportion of ij−1:1:j.

The fourth planetary gear system PGS4 is also a single-pinion planetary gear system and includes a sun gear Sd, a ring gear Rd, and a carrier Cd, which supports the pinion Pd engaged with the sun gear Sd and the ring gear Rd in such manner that the pinion Pd freely rotates and orbits.

With reference to the collinear diagram of the fourth planetary gear system PGS4, which is illustrated at the bottom of FIG. 2, if the three elements Sd, Cd, and Rd of the fourth planetary gear system PGS4 are respectively defined as fourth, fifth, and sixth elements on the basis of the distances thereof from the left of the collinear diagram, which corresponds to the gear ratios, the fourth element is the ring gear Rd, the fifth element is the carrier Cd, and the sixth element is the sun gear Sd. The ratio of the distance between the sun gear Sd and the carrier Cd to the distance between the carrier Cd and the ring gear Rd is set to k:1, where k represents the gear ratio of the fourth planetary gear system PGS4.

The sun gear Sa (first element) of the first planetary gear system PGS1 is connected to the input shaft 2. The ring gear Rd (fourth element) of the fourth planetary gear system PGS4 is connected to the output member 3, which is an output gear.

The ring gear Ra (third element) of the first planetary gear system PGS1 and the sun gear Sd (sixth element) of the fourth planetary gear system PGS4 are connected to constitute a first connected body Ra-Sd. The third rotary element Y3 and the carrier Cd (fifth element) of the fourth planetary gear system PGS4 are connected to constitute a second connected body Y3-Cd.

The automatic transmission according to the first embodiment includes an engagement mechanism, having first, second, and third clutches C1, C2, and C3 and first, second, and third brakes B1, B2, and B3.

The first clutch C1 is a wet multi-disc clutch and can be freely switched between a connected state and a disconnected; in the connected state, the sun gear Sa (first element) of the first planetary gear system PGS1 and the second rotary element Y2 are connected, and, in the disconnected state, the sun gear Sa and the second rotary element Y2 are disconnected.

The second clutch C2 is a wet multi-disc clutch and can be switched between a connected state in which the sun gear Sa (first element) of the first planetary gear system PGS1 and the first rotary element Y1 are connected and a disconnected state in which the sun gear Sa and the first rotary element Y1 are disconnected.

The third clutch C3 is a meshing mechanism, which includes dog clutch or a synchromesh mechanism having a synchronization function, and can be switched between a connected state and a disconnected state; in the connected state, the carrier Ca (second element) of the first planetary gear system PGS1 and the fourth rotary element Y4 are connected, and in the disconnected state, the carrier Ca and the fourth rotary element Y4 are disconnected. Instead, the third clutch C3 may be a wet multi-disc clutch.

The first brake B1 is a wet multi-disc brake and can be switched between a fixed state and a disconnected state; in the fixed state, the first connected body Ra-Sd is fixed to the transmission case 1, and in the disconnected state, the first connected body Ra-Sd is disconnected from the transmission case 1.

The second brake B2 is a meshing mechanism, which includes a dog clutch or a synchromesh mechanism having a synchronization function, and can be switched between a fixed state and a disconnected state; in the fixed state, the second rotary element Y2 is fixed to the transmission case 1, and in the disengaged state, the second rotary element Y2 is disconnected from the transmission case 1.

The automatic transmission according to the first embodiment includes a one-way clutch F1, which is adjacent to the second brake B2 and allows normal rotation but prevents reverse rotation of the second rotary element Y2.

The third brake B3 is a wet multi-disc brake and can be switched between a fixed state and a disconnected state; in the fixed state, the carrier Ca (second element) of the first planetary gear system PGS1 is fixed to the transmission case 1, and in the disconnected state, the carrier Ca is disconnected from the transmission case 1.

The clutches C1 to C3 and the brakes B1 to B3 are switched between the different states by a transmission control unit (TCU) (not shown) on the basis of vehicle information, such as traveling speed of the vehicle.

The third planetary gear system PGS3 is disposed radially outward of the second planetary gear system PGS2. The ring gear Rb of the second planetary gear system PGS2 and the sun gear Sc of the third planetary gear system PGS3 are connected into a single unit. By disposing the third planetary gear system PGS3 radially outward of the second planetary gear system PGS2, the second planetary gear system PGS2 and the third planetary gear system PGS3 overlap each other in the radial direction, reducing the shaft length of the automatic transmission.

To reduce the shaft length, the second planetary gear system PGS2 and the third planetary gear system PGS3 only have to partially overlap with each other in the radial direction. The shaft length can be minimized if the second planetary gear system PGS2 and the third planetary gear system PGS3 completely overlap each other in the radial direction.

The output member 3, which includes an output gear, is interposed between the first planetary gear system PGS1 and the fourth planetary gear system PGS4. The transmission case 1 includes a sidewall 1a, which extends radially inward between the output member 3 and the first planetary gear system PGS1. The sidewall 1a has a cylindrical part 1b, which extends inward of the output member 3 in the radial direction. The output member 3 is supported by the cylindrical part 1b with a bearing in such a manner that the output member 3 rotates. With such a configuration, the output member 3 can be firmly and rotatably supported by a mechanically strong cylindrical part 1b connected to the transmission case 1.

The establishment of each gear of the automatic transmission according to the first embodiment will be described with reference to FIGS. 2 and 3A to 3D.

To establish first gear, the third clutch C3 is set to a connected state, and the first brake B1 is set to a fixed state. By setting the first brake B1 to a fixed state, the rotational speed of the first connected body Ra-Sd is set to zero. By setting the third clutch C3 to a connected state, the carrier Ca (second element) of the first planetary gear system PGS1 and the fourth rotary element Y4 are connected and rotate at a same speed. The operation of the one-way clutch F1 causes the rotational speed of the second rotary element Y2 to be set to zero. The rotational speed of the ring gear Rd (fourth element) of the fourth planetary gear system PGS4, which is connected to the output member 3, is set to "1st", as illustrated in FIG. 2, and first gear is established.

In first gear, since the second brake B2 is in a disconnected state, the number of disconnected engagement mechanisms is four. Since the second brake B2 is a meshing mechanism, even when it is in a disengaged state, friction loss is reduced, compared with that of a wet multi-disc brake. Since the operation of the one-way clutch F1 causes the rotational speed of the second rotary element Y2 to be set to zero, friction loss does not occur with the second brake B2, even if the second brake B2 is a wet multi-disc brake. Therefore, the substantial number of disconnected engagement mechanisms in first gear is three.

If the second brake B2 is also set to a fixed state in first gear, engine brake can be applied.

To establish second gear, the third clutch C3 is set to a connected state, and the third brake B3 is set to a fixed state. By setting the third brake B3 to a fixed state, the rotational speed of the carrier Ca (second element) of the first planetary gear system PGS1 is set to zero. By setting the third clutch C3 to a connected state, the rotational speed of the fourth rotary element Y4 is set to zero, which is the same rotational speed as the carrier Ca (second element) of the first planetary gear system PGS1. The operation of the one-way clutch F1 causes the rotational speed of the second rotary element Y2 to be set to zero.

Since the rotational speed of the second rotary element Y2 and the fourth rotary element Y4, which is two among the rotary elements Y1 to Y4, are both zero, the rotary elements Y1 to Y4 are set to a locked state in which relative rotation is prevented, and thus, the rotational speed of the third rotary element Y3, i.e., second connected body Y3-Cd, is also set to zero. The rotational speed of the ring gear Rd (fourth element) of the fourth planetary gear system PGS4, which is connected to the output member 3, is set to "2nd", as illustrated in FIG. 2, and second gear is established.

In second gear, since the second brake B2 is in a disconnected state, the number of disconnected engagement mechanisms is four. Similar to first gear, friction loss does not occur at the second brake B2. Therefore, the substantial number of disconnected engagement mechanisms in second gear is three.

If the second brake B2 is also set to a fixed state in second gear, engine brake can be applied.

To establish third gear, the second clutch C2 and the third clutch C3 are set to a connected state. By setting the second clutch C2 to a connected state, the sun gear Sa (first element) of the first planetary gear system PGS1 and the first rotary element Y1 both rotate at the same rotational speed "1". By setting the third clutch C3 to a connected state, the carrier Ca (second element) of the first planetary gear system PGS1 and the fourth rotary element Y4 are connected and rotate at the same rotational speed. The operation of the one-way clutch F1 causes the rotational speed of the second rotary element Y2 to be set to zero. The rotational speed of the ring gear Rd (fourth element) of the fourth planetary gear system PGS4, which is connected to the output member 3, is set to "3rd", as illustrated in FIG. 2, and third gear is established.

In third gear, since the second brake B2 is in a disconnected state, the number of disconnected engagement mechanisms is four. Similar to first and second gears, friction loss does not occur at the second brake B2. Therefore, the substantial number of disconnected engagement mechanisms in third gear is three.

If the second brake B2 is also set to a fixed state in third gear, engine brake can be applied.

To establish fourth gear, the second clutch C2 and the third clutch C3 are set to a connected state, and the third brake B3 is set to a fixed state. By setting the second clutch C2 to a connected state, the sun gear Sa (first element) of the first planetary gear system PGS1 and the first rotary element Y1 both rotate at the same rotational speed "1". By setting the third brake B3 to a fixed state, the rotational speed of the carrier Ca (second element) of the first planetary gear system PGS1 is set to zero.

By setting the third clutch C3 to a connected state, the rotational speed of the fourth rotary element Y4 is set to zero, which is the same rotational speed as the carrier Ca (second element) of the first planetary gear system PGS1. The rotational speed of the ring gear Rd (fourth element) of the fourth planetary gear system PGS4, which is connected to the output member 3, is set to "4th", as illustrated in FIG. 2, and fourth gear is established.

To establish fifth gear, the second clutch C2 and the third clutch C3 are set to a connected state, and the first brake B1 is set to a fixed state. By setting the second clutch C2 to a connected state, the sun gear Sa (first element) of the first planetary gear system PGS1 and the first rotary element Y1 both rotate at the same speed "1". By setting the third clutch C3 in a connected state, the carrier Ca (second element) of the first planetary gear system PGS1 and the fourth rotary element Y4 are connected and rotate at the same speed. By setting the first brake B1 to a fixed state, the rotational speed of the first connected body Ra-Sd is set to zero. The rotational speed of the ring gear Rd (fourth element) of the fourth planetary gear system PGS4, which is connected to the output member 3, is set to "5th", as illustrated in FIG. 2, and fifth gear is established.

To establish sixth gear, the first, second, and third gears C1, C2, and C3 are set to a connected state. By setting the first clutch C1 and the second clutch C2 to a connected state, the first rotary element Y1 and the second rotary element Y2 both rotate at the same rotational speed "1", and the first to fourth rotary elements Y1 to Y4 are set to a locked state in which relative rotation is prevented and rotate at the rotational speed "1". By setting the third clutch C3 to a connected state, the carrier Ca (second element) of the first planetary gear system PGS1 and the fourth rotary element Y4 both rotate at the same rotational speed "1".

Accordingly, the sun gear Sa (first element) and carrier Ca (second element) of the first planetary gear system PGS1 both rotate at the same rotational speed "1"; the elements Sa, Ca, and Ra are set to a locked state in which relative rotation is prevented; and the rotational speed of the ring gear Ra (third element), i.e., first connected body Ra-Sd, is set to "1". The fourth, fifth, and sixth rotary elements Rd, Cd, and Sd of the fourth planetary gear system PGS4 are also set to a locked state in which relative rotation is prevented; the rotational speed of the ring gear Rd (fourth element) of the fourth planetary gear system PGS4, which is connected to the output member 3, is set to "6th", which is the rotational speed "1"; and sixth gear is established.

To establish seventh gear, the first clutch C1 and the third clutch C3 are set to a connected state, and the first brake B1 is set to a fixed state. By setting the first clutch C1 to a connected state, the sun gear Sa (first element) of the first planetary gear system PGS1 and the second rotary element Y2 both rotate at the same rotational speed "1". By setting the third clutch C3 to a connected state, the carrier Ca (second element) of the first planetary gear system PGS1 and the fourth rotary element Y4 both rotate at the same rotational speed.

By setting the first brake B1 to a fixed state, the rotational speed of the first connected body Ra-Sd is set to zero. The rotational speed of the ring gear Rd (fourth element) of the fourth planetary gear system PGS4, which is connected to the output member 3, is set to "7th", as illustrated in FIG. 2, and seventh gear is established.

To establish eighth gear, the first clutch C1 and the second clutch C2 are set to a connected state, and the first brake B1 is set to a fixed state. By setting the first clutch C1 and the second clutch C2 to a connected state, the first rotary element Y1 and the second rotary element Y2 both rotate at the same rotational speed "1"; the first to fourth rotary elements Y1 to Y4 are set to a locked state in which relative rotation is prevented; and the second connected body Y3-Cd is set to the rotational speed "1".

By setting the first brake B1 to a fixed state, the rotational speed of the first connected body Ra-Sd is set to zero. The rotational speed of the ring gear Rd (fourth element) of the fourth planetary gear system PGS4, which is connected to the output member 3, is set to "8th" ((k+1)/k), as illustrated in FIG. 2, and eighth gear is established.

To establish ninth gear, the first clutch C1 and the second clutch C2 are set to a connected state, and the third brake B3 is set to a fixed state. By setting the first clutch C1 and the second clutch C2 to a connected state, the first rotary element Y1 and the second rotary element Y2 both rotate at the same rotational speed "1"; and the first to fourth rotary elements Y1 to Y4 are set to a locked state in which relative rotation is prevented and rotate at the rotational speed "1".

By setting the third brake B3 in a fixed state, the rotational speed of the carrier Ca (second element) of the first planetary gear system PGS1 is set to zero. The rotational speed of the ring gear Rd (fourth element) of the fourth planetary gear system PGS4, which is connected to the output member 3, is set to "9th", as illustrated in FIG. 2, and ninth gear is established.

To establish reverse gear, the second clutch C2 is set to a connected state, and the first brake B1 and the second brake B2 are set to a fixed state. By setting the second clutch C2 to a connected state, the sun gear Sa (first element) of the first planetary gear system PGS1 and the first rotary element Y1 rotate at the same speed "1". By setting the first brake B1 to a fixed state, the rotational speed of the first connected body Ra-Sd is set to zero.

By setting the second brake B2 to a fixed state, the rotational speed of the second rotary element Y2 is set to zero. The rotational speed of the ring gear Rd (fourth element) of the fourth planetary gear system PGS4, which is connected to the output member 3, is set to "Rvs" for reverse rotation (rotation in the direction that makes the vehicle move backward) as illustrated in FIG. 2, and reverse gear is established.

FIG. 3A illustrates the states of the clutches C1, C2, and C3, the brakes B1, B2, and B3, and the one-way clutch F1 for each gear, where the circles in the cells in the columns corresponding to the clutches C1, C2, and C3 and the brakes B1, B2, and B3 represent a connected state or a fixed state, and blank cells represent a disconnected state. The circles in the cells in the column corresponding to the one-way clutch F1 represent a state in which the rotational speed of the second rotary element Y2 is set to zero as a result of the operation of the one-way clutch F1.

FIG. 3B illustrates the gear ratios of each gear ((rotational speed of input shaft 2)/(rotational speed of output member 3)), where the gear ratio h of the first planetary gear system PGS1 is 1.885, the gear ratio i of the second planetary gear system PGS2 is 2.236, the gear ratio j of the third planetary gear system PGS3 is 1.779, and the gear ratio k of the fourth planetary gear system PGS4 is 1.793, as shown in FIG. 3D. Accordingly, the common ratios (ratios of the inter-gear ratios) are set appropriately, as shown in FIG. 3C, and the ratio ranges ((gear ratio of first gear)/(gear ratio of ninth gear)), which are shown in FIG. 3D, are also set appropriately.

With the automatic transmission according to the first embodiment, forward nine-speed is established. In each gear, the number of disconnected wet multi-disc clutches and wet multi-click brakes is three or smaller, and friction loss is reduced, improving transmission efficiency of the driving force.

In a high-speed gear range exceeding seventh gear, which is a middle-speed gear, and including eighth and ninth gears, the third clutch C3, which is constituted of a meshing mechanism having a friction loss smaller than a wet multi-disc clutch, is set to a disconnected state, where seventh gear is defined as a predetermined middle-speed gear, first to seventh gears are defined as a low-speed gear range, and eighth and ninth gears are defined as a high-speed gear range, in the high-speed gear range.

The second brake B2, which is set to a disconnected state in all gears except in reverse gear, is also constituted of a meshing mechanism. Thus, in the high-speed gear range, the number of disconnected wet multi-disc clutches and wet multi-disc is one, reducing friction loss during high-speed operation of the vehicle and improving fuel consumption.

The third clutch C3, which is constituted of a meshing mechanism, is switched between a connected state and a disconnected state between the seventh gear, which is the predetermined middle-speed gear, and the eighth gear. The transmitted torque (transmitted driving force) at the third clutch C3 in seventh gear (predetermined middle-speed gear) is relatively small; thus, even if the third clutch C3 is constituted of a dog clutch, which is an engagement mechanism, switching between a connected state and a disconnected state can be smoothly carried out when the gear is shifted from seventh to eighth gear.

Since all of the planetary gear systems PGS1 to PGS4 are constituted of single-pinion planetary gear systems, the number of gear engagement in the transmission route of the driving force can be reduced, and the transmission efficiency can be improved, compared with a double-pinion planetary gear system including a sun gear, a ring gear, and a carrier, which supports a pair of pinions in such a manner that the pinions freely rotate and orbit, the pinions engaging with each other, one of the pinions engaging with the sun gear, and the other pinion engaging with the ring gear. (A double-pinion planetary gear system is also known as "plus planetary gear system" or "positive planetary gear system" because the sun gear and the ring gear rotate in the same direction when the carrier is fixed. When the ring gear is fixed, the sun gear and the carrier rotate in difference directions).

Since the one-way clutch F1 adjoins the second brake B2, the state of the second brake B2 does not have to be switched when the gear is shifted between third gear and fourth gear, and the gear shift control is improved.

In the first embodiment, the third clutch C3 and the second brake B2 are constituted of meshing mechanisms. Even when they are respectively constituted of a wet multi-disc clutch and a wet multi-disc brake, the number of disconnected wet multi-disc clutches and wet multi-click brakes is three or smaller in each gear, and the advantage of the first aspect of the present invention in which friction loss is reduced is achieved.

The one-way clutch F1 may be omitted. In such a case, the second brake B2 may be set to a fixed state to establish first to third gears. If the one-way clutch F1 is omitted, the second brake B2 may be a two-way clutch, which can be switched between a fixed state and a reverse-rotation prevention state; in the fixed state, the second rotary element Y2 is fixed to the transmission case 1, and in the reverse-rotation prevention state, forward rotation of the second rotary element Y2 is allowed but reverse rotation is prevented. An example two-way clutch will be described below in detail with reference to FIGS. 9A to 9C.

Figure 9A:
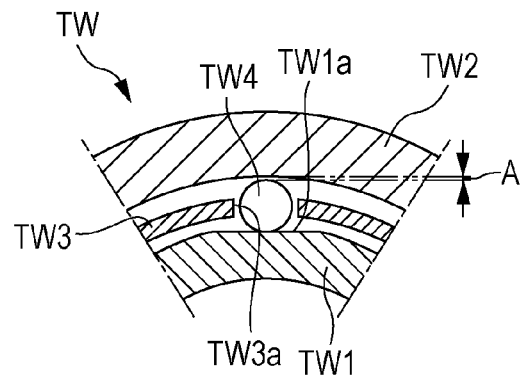
FIGS. 9A to 9C are sectional views of an example two-way clutch constituting a second brake.
Figure 9B:
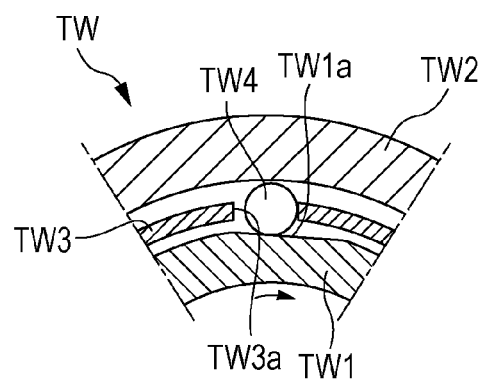
Figure 9C:
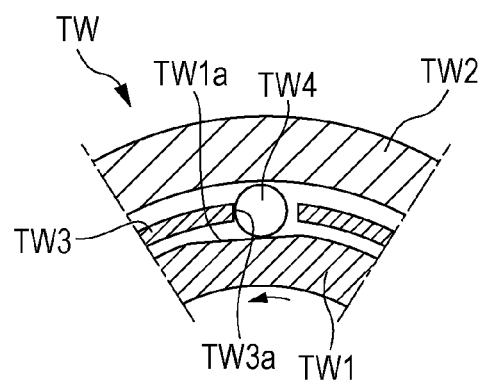

A two-way clutch TW, which is the second brake B2 illustrated in FIGS. 9A to 9C includes an inner ring TW1, which is connected to the second rotary element Y2, an outer ring TW2, which is disposed radially outward of the inner ring TW1 and connected to the transmission case 1, and a retaining ring TW3, which is interposed between the inner ring TW1 and the outer ring TW2.

The outer circumferential surface of the inner ring TW1 has a plurality of cam surfaces TW1a. The retaining ring TW3 has a plurality of holes TW3a, which correspond to the cam surfaces TW1a. The holes TW3a accommodate rollers TW4. The two-way clutch TW includes first and second electromagnetic clutches, which are not shown in the drawing. When conductive, the first electromagnetic clutch connects the outer ring TW2 and the retaining ring TW3. When the first electromagnetic clutch is not conductive, the retaining ring TW3 can freely rotate relative to the inner ring TW1 and the outer ring TW2.

The diameter of each roller TW4 is set such that a gap A is formed when the roller TW4 is positioned at the center of the cam surfaces TW1a, as illustrated in FIG. 9A, and such that the roller TW4 contacts the inner ring TW1 and the outer ring TW2 when the rollers TW4 is positioned at the end of the cam surface TW1a, as illustrated in FIGS. 9B and 9C.

When the first electromagnetic clutch is not conductive, the retaining ring TW3 can freely rotate; therefore, as illustrated in FIG. 9A, the roller TW4 remains at the center of the cam surface TW1a. Consequently, the inner ring TW1 of the two-way clutch TW can freely rotate.

When the first electromagnetic clutch is conductive, the retaining ring TW3 is fixed to the transmission case 1 by the outer ring TW2. In such a case, either forward or reverse rotation of the inner ring TW1 causes the roller TW4 to be positioned at the end of the cam surface TW1a because the retaining ring TW3 is fixed, as illustrated in FIGS. 9B and 9C.

At this time, the roller TW4 is interposed between the cam surface TW1a and the inner circumferential surface of the outer ring TW2, preventing the inner ring TW1 from rotating. In other words, the two-way clutch TW is in a fixed state.

The second electromagnetic clutch can be freely switched among three states: a first state, a second state, and a disconnected state. In the first state, the retaining ring TW3 is connected to the inner ring TW1 with the hole TW3a formed at one end of the cam surface TW1a, as illustrated in FIG. 9B; in the second state, the retaining ring TW3 is connected to the inner ring TW1 with the hole TW3a formed at the other end of the cam surface TW1a, as illustrated in FIG. 9C; and in the disconnected state, the retaining ring TW3 and the inner ring TW1 are disconnected.

If the clockwise direction in FIGS. 9A to 9C is the direction of reserve rotation, the two-way clutch TW is set to a reverse-rotation prevention state as a result of disconnecting the outer ring TW2 and the retaining ring TW3 by setting the first electromagnetic clutch in a non-conductive state (conductivity-off state) and setting the second electromagnetic clutch to the first state.

When the second brake B2 is constituted of such a two-way clutch TW, gears can be established by setting the two-way clutch TW to a fixed state for first, second, and third gears and reverse gear and to a reverse-rotation prevention state from fourth to ninth gears.

When the second brake B2 is constituted of the two-way clutch TW, as described above, friction loss does not occur at the second brake B2, unlike when the second brake B2 is constituted of a frictional engagement brake. Thus, similar to when the second brake B2 is constituted of a meshing mechanism, friction loss can be reduced in the entire automatic transmission.

When operating in third gear and shift-up to fourth gear is expected on the basis of vehicle information, such as traveling speed, it is preferable that the TCU (not shown) switch the two-way clutch TW, which constitutes the second brake B2, to the reverse-rotation prevention state in advance.

Accordingly, similar to the advantage of the one-way clutch F1, when shifting up from third gear to fourth gear, the only operation required will be setting the third brake B3 to a fixed state because the switching of the state of the two-way clutch TW, which constitutes the second brake B2, is already completed. Therefore, smooth shift-up to fourth gear is possible, and the shift control of the automatic transmission is improved.

In addition to the fixed state and the reverse-rotation prevention state, the two-way clutch TW, having the configuration described above, can also be freely switched between a disconnected state and a forward-rotation prevention state; in the disconnected state, the second rotary element Y2 is disconnected from the transmission case 1, and in the forward-rotation prevention state, forward rotation of the second rotary element Y2 is prevented but reverse rotation is allowed.

Specifically, by setting the first electromagnetic clutch to a conductivity-off state and the second electromagnetic clutch to a disconnected state, the rollers TW4 continue to be positioned at the centers of the cam surfaces TW1a, as illustrated in FIG. 9A, and the two-way clutch TW is set to a disconnected state in which the inner ring TW1 can freely rotate with respect to the outer ring TW2.

By setting the first electromagnetic clutch to a conductivity-off state and the second electromagnetic clutch to the second state in which the retaining ring TW3 is connected to the inner ring TW1 and the holes TW3a are formed at the other ends of the cam surfaces TW1a, as illustrated in FIG. 9C, the two-way clutch TW is set to the forward-rotation prevention state in which forward rotation of the inner ring TW1 is prevented but reverse rotation is allowed.

The above-described second electromagnetic clutch of the two-way clutch TW can be omitted, and the two-way clutch TW, which constitutes the second brake B2, can be freely switched between a fixed state and a disconnected state by switching the first electromagnetic clutch. In such a case, gears can be established by switching the two-way clutch TW to a fixed state for first to third gears and reverse gear and to a disconnected state for fourth to ninth gears.

In the first embodiment, forward nine-speed gear shift is established. Instead, second, fourth, and ninth gears may be omitted, and forward six-speed gear shift may be established.

Similar to a second embodiment described below, the fourth planetary gear system PGS4 may be disposed radially outward of the first planetary gear system PGS1, and the ring gear Ra (third element) of the first planetary gear system PGS1 and the sun gear Sd (sixth element) of the fourth planetary gear system PGS4, which constitute the first connected body Ra-Sd, may be connected into an integrated body. In this way, the shaft length can be reduced even more.

Second Embodiment

Figure 4:
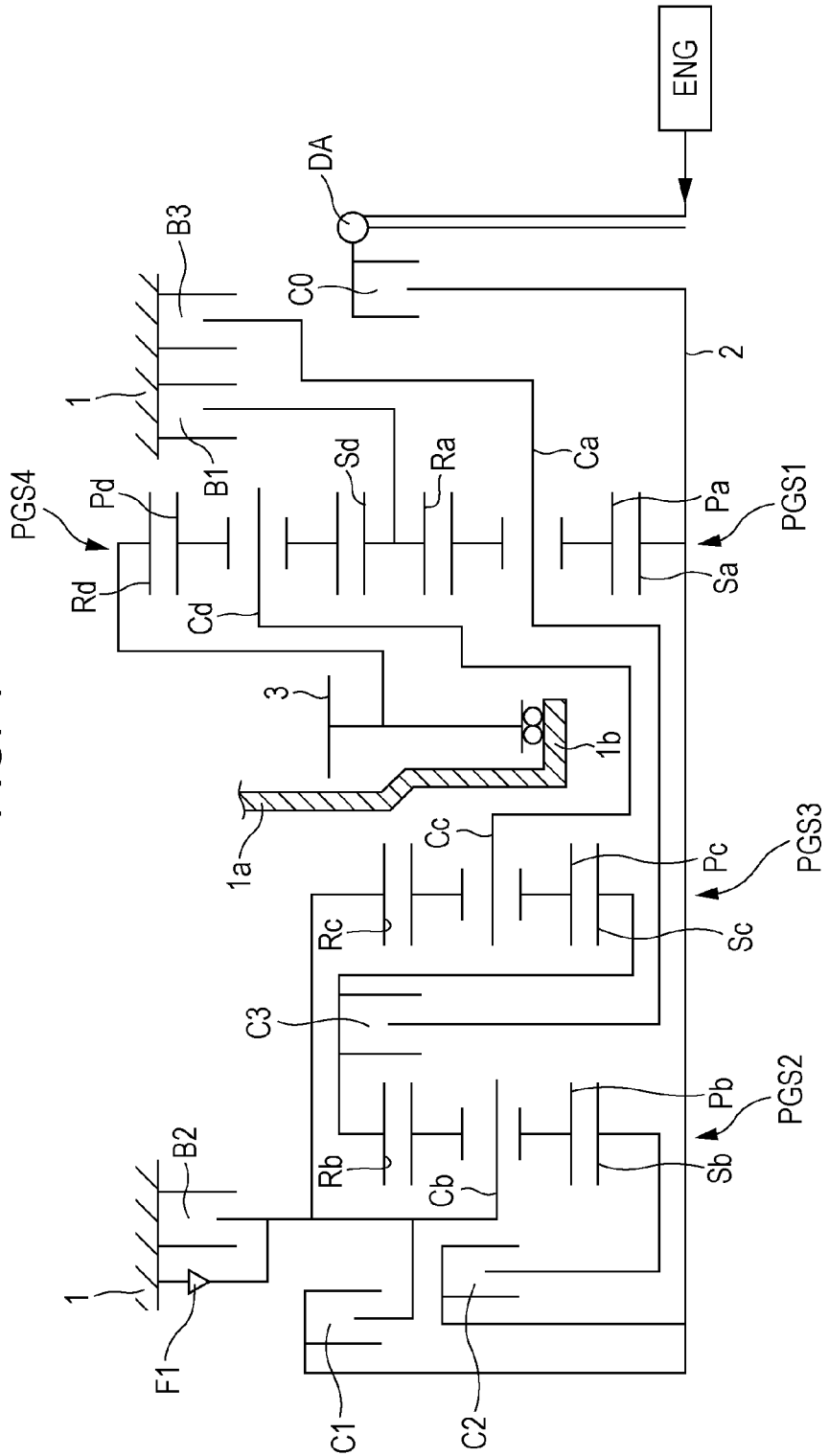
FIG. 4 is a skeleton diagram of the upper half of an automatic transmission according to a second embodiment of the first aspect of the present invention.
Figure 5:
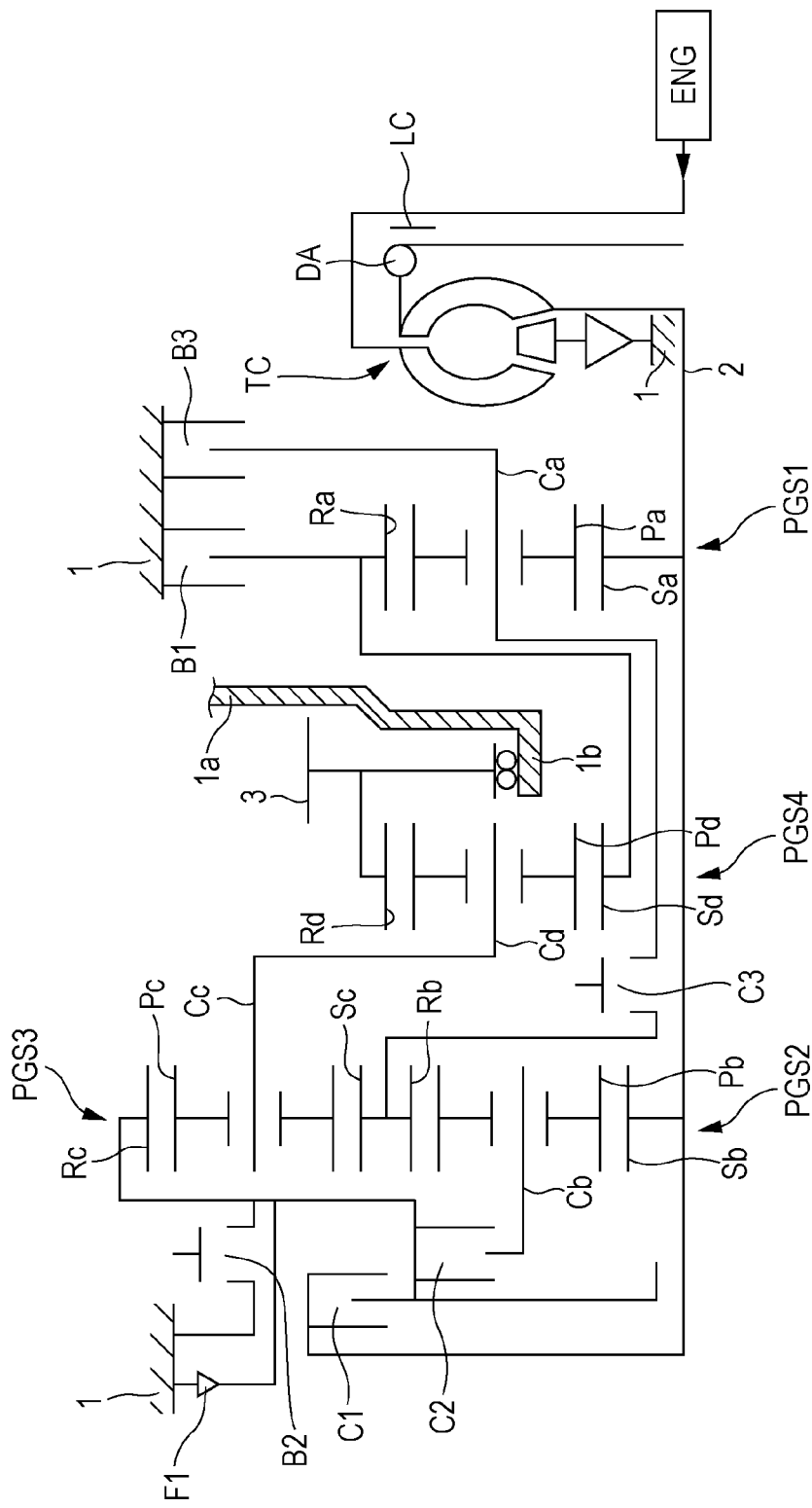
FIG. 5 is a skeleton diagram of the upper half of an automatic transmission according to a third embodiment of a second aspect of the present invention.

An automatic transmission according to a second embodiment of the first aspect of the present invention will be described with reference to FIG. 4. The automatic transmission according to the second embodiment has the same configuration as the automatic transmission according to the first embodiment, and the same gears can be established, except that a damper DA and a single-disc or multi-disc starting clutch C0, which is capable of transmitting a driving force of a driving source ENG to the input shaft 2 by frictional engagement, is disposed, instead of a torque converter; the third planetary gear system PGS3 is interposed between the first planetary gear system PGS1 and the third clutch C3, instead of being disposing radially outward of the second planetary gear system PGS2; the fourth planetary gear system PGS4 is disposed radially outward of the first planetary gear system PGS1; the ring gear Ra (third element) of the first planetary gear system PGS1 and the sun gear Sd (sixth element) of the fourth planetary gear system PGS4, which constitute the first connected body Ra-Sd, are connected into an integrated body; and the output member 3, which is an output gear, is interposed between the first planetary gear system PGS1 and the third planetary gear system PGS3.

With the automatic transmission according to the second embodiment, the same advantages as those of the first embodiment are achieved. As in the first embodiment, in the second embodiment, a torque converter may be disposed instead of the starting clutch C0. As in the first embodiment, the third planetary gear system PGS3 may be disposed radially outward of the second planetary gear system PGS2, and the ring gear Rb of the second planetary gear system PGS2 and the sun gear Sc of the third planetary gear system PGS3 may be connected to constitute the fourth rotary element Y4.

Third Embodiment

An automatic transmission according to a third embodiment of a second aspect the present invention will be described with reference to FIGS. 5 to 7D. The automatic transmission according to the third embodiment includes an input shaft 2 and output member 3; the input shaft 2 is supported inside a transmission case 1 in such a manner that the input shaft 2 freely rotates and receives a driving force output from a driving source ENG, such as an engine, via a torque converter TC, which includes a lockup clutch LC and a damper DA; and the output member 3 includes an output gear disposed concentrically with the input shaft 2. The rotation of the output member 3 is transmitted to the left and right drive wheels of a vehicle via a differential gear and a propeller shaft, which are not shown in the drawing. Instead of the torque converter TC, a single-disc or multi-disc starting clutch, which is capable of frictional engagement, may be provided.

Inside the transmission case 1, first to fourth planetary gear systems PGS1 to PGS4 are disposed concentrically with the input shaft 2.

The first planetary gear system PGS1 is a single-pinion planetary gear system and includes a sun gear Sa, a ring gear Ra, and a carrier Ca, which supports a pinion Pa engaged with the sun gear Sa and the ring gear Ra in such manner that the pinion Pa freely rotates and orbits. The first planetary gear system PGS1 is also known as "minus planetary gear system" or "negative planetary gear system" because, when the carrier Ca is fixed, the sun gear Sa and the ring gear Ra rotate in different directions. When the ring gear Ra is fixed, the sun gear Sa and the carrier Ca rotate in the same direction.

Figure 6:
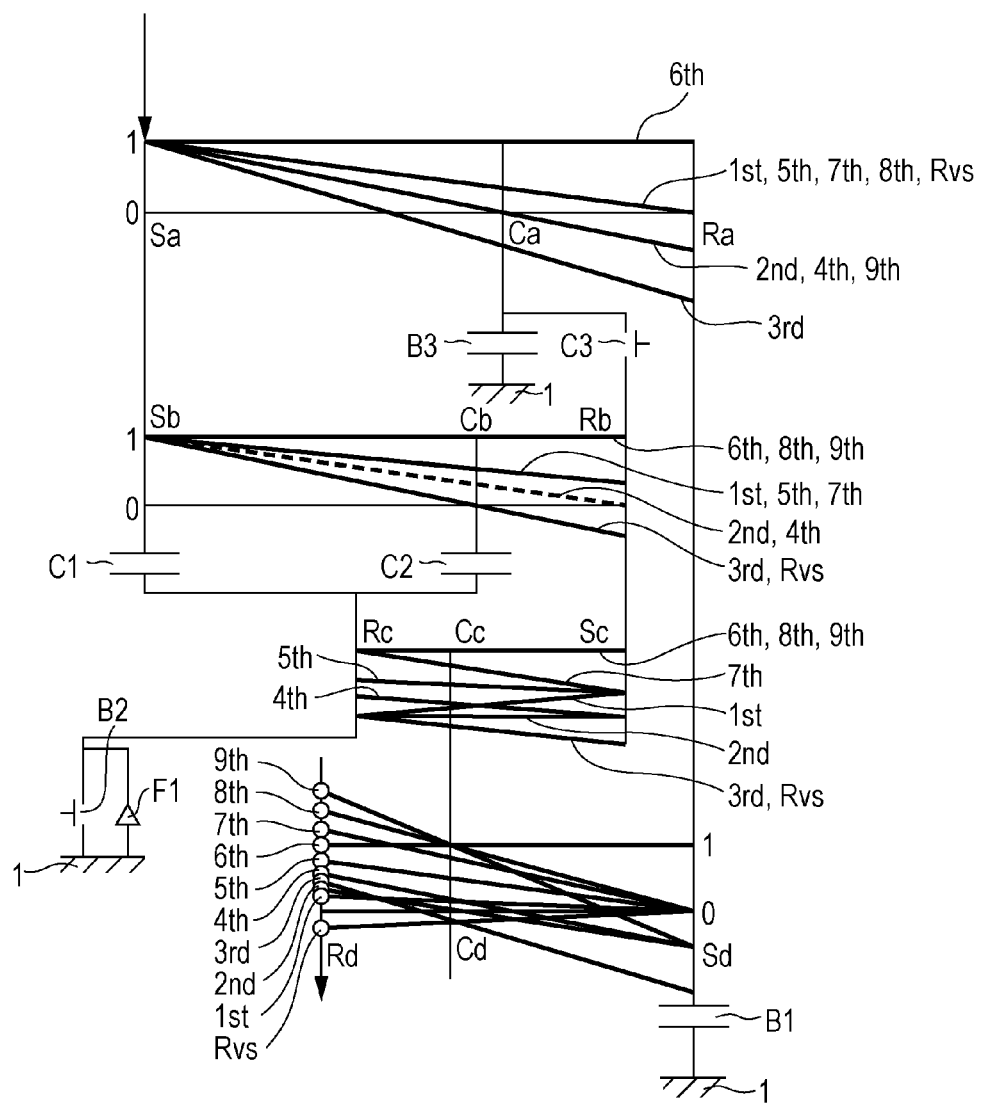
FIG. 6 is a collinear diagram illustrating the ratios of the relative rotational speeds of elements in first to fourth planetary gear systems of the automatic transmission according to the third embodiment.

With reference to the collinear diagram of the first planetary gear system PGS1, which is illustrated at the first row in FIG. 6 (in which the ratios of the relative rotational speeds of the three elements are represented by straight lines (speed lines)), if the three elements Sa, Ca, and Ra of the first planetary gear system PGS1 are respectively defined as first, second, and third elements on the basis of the distances thereof from the left of the collinear diagram, which corresponds to the gear ratios, the first element is the sun gear Sa, the second element is the carrier Ca, and the third element is the ring gear Ra. The ratio of the distance between the sun gear Sa and the carrier Ca to the distance between the carrier Ca and the ring gear Ra is set to h:1, where h represents the gear ratio (number of ring gear teeth/number of sun gear teeth) of the first planetary gear system PGS1.

In the collinear diagram of the first planetary gear system PGS1, the lower transverse line represents a rotational speed of zero, and the upper transverse line represents a rotational speed of "1", which is same as the rotational speed of the input shaft being normalized to "1".

The second planetary gear system PGS2 is also a single-pinion planetary gear system and includes a sun gear Sb, a ring gear Rb, and a carrier Cb, which supports the a pinion Pb engaged with the sun gear Sb and the ring gear Rb in such manner that the pinion Pb freely rotates and orbits.

With reference to the collinear diagram of the second planetary gear system PGS2, which is illustrated at the second row in FIG. 6 (in which the ratios of the relative rotational speeds of the three elements are represented by straight lines (speed lines)), if the three elements Sb, Cb, and Rb of the second planetary gear system PGS2 are respectively defined as fourth, fifth, and sixth elements on the basis of the distances thereof from the left of the collinear diagram, which corresponds to the gear ratios, the fourth element is the sun gear Sb, the fifth element is the carrier Cb, and the sixth element is the ring gear Rb. The ratio of the distance between the sun gear Sb and the carrier Cb to the distance between the carrier Cb and the ring gear Rb is set to i:1, where i represents the gear ratio (number of ring gear teeth/number of sun gear teeth) of the second planetary gear system PGS2.

The third planetary gear system PGS3 is also a single-pinion planetary gear system and includes a sun gear Sc, a ring gear Rc, and a carrier Cc, which supports a pinion Pc engaged with the sun gear Sc and the ring gear Rc in such manner that the pinion Pc freely rotates and orbits.

With reference to the collinear diagram of the third planetary gear system PGS3, which is illustrated at the third row in FIG. 6 (in which the ratios of the relative rotational speeds of the three elements are represented by straight lines (speed lines)), if the three elements Sc, Cc, and Rc of the third planetary gear system PGS3 are respectively defined as seventh, eighth, and ninth elements on the basis of the distances thereof from the left of the collinear diagram, which corresponds to the gear ratios, the seventh element is the ring gear Rc, the eighth element is the carrier Cc, and the ninth element is the sun gear Sc. The ratio of the distance between the sun gear Sc and the carrier Cc to the distance between the carrier Cc and the ring gear Rc is set to j:1, where j represents the gear ratio (number of ring gear teeth/number of sun gear teeth) of the third planetary gear system PGS3.

The fourth planetary gear system PGS4 is also a single-pinion planetary gear system and includes a sun gear Sd, a ring gear Rd, and a carrier Cd, which supports a pinion Pd engaged with the sun gear Sd and the ring gear Rd in such manner that the pinion Pd freely rotates and orbits.

With reference to the collinear diagram of the fourth planetary gear system PGS4, which is illustrated at the fourth row in FIG. 6, if the three elements Sd, Cd, and Rd of the fourth planetary gear system PGS4 are respectively defined as tenth, eleventh, and twelfth elements on the basis of the distances thereof from the left of the collinear diagram, which corresponds to the gear ratios, the tenth element is the ring gear Rd, the eleventh element is the carrier Cd, and the twelfth element is the sun gear Sd. The ratio of the distance between the sun gear Sd and the carrier Cd to the distance between the carrier Cd and the ring gear Rd is set to k:1, where k represents the gear ratio of the fourth planetary gear system PGS4.

In the automatic transmission according to the third embodiment, the ring gear Ra (third element) of the first planetary gear system PGS1 and the sun gear Sd (twelfth element) of the fourth planetary gear system PGS4 are connected to constitute a first connected body Ra-Sd. The carrier Cc (eighth element) of the third planetary gear system PGS3 and the carrier Cd (eleventh element) of the fourth planetary gear system PGS4 are connected to constitute a second connected body Cc-Cd.

The sun gear Sa (first element) of the first planetary gear system PGS1 and the sun gear Sb (fourth element) of the second planetary gear system PGS2 are connected to constitute a third connected body Sa-Sb. The ring gear Rb (sixth element) of the second planetary gear system PGS2 and the sun gear Sc (ninth element) of the third planetary gear system PGS3 are connected to constitute a fourth connected body Rb-Sc.

The third connected body Sa-Sb is connected to the input shaft 2. The ring gear Rd (tenth element) of the fourth planetary gear system PGS4 is connected to the output member 3, which is an output gear.

The automatic transmission according to the third embodiment includes an engagement mechanism, having first, second, and third clutches C1, C2, and C3 and first, second, and third brakes B1, B2, and B3.

The first clutch C1 is a wet multi-disc clutch and can be freely switched between a connected state and a disconnected; in the connected state, the third connected body Sa-Sb and the ring gear Rc (seventh element) of the third planetary gear system PGS3 are connected, and in the disconnected state, the third connected body Sa-Sb and the ring gear Rc are disconnected.

The second clutch C2 is a wet multi-disc clutch and can be freely switched between a connected state and a disconnected; in the connected state, the carrier Cb (fifth element) of the second planetary gear system PGS2 and the ring gear Rc (seventh element) of the third planetary gear system PGS3 are connected, and in the disconnected state, the carrier Cb and the ring gear Rc are disconnected.

The third clutch C3 is an engagement mechanism, which includes dog clutch or a synchromesh mechanism having a synchronization function, and can be switched between a connected state and a disconnected state; in the connected state, the carrier Ca (second element) of the first planetary gear system PGS1 and the fourth connected body Rb-Sc are connected, and in the disconnected state, the carrier Ca and the fourth connected body Rb-Sc are disconnected. Instead, the third clutch C3 may be a wet multi-disc clutch.

The first brake B1 is a wet multi-disc brake and can be switched between a fixed state and a disconnected state; in the fixed state, the first connected body Ra-Sd is fixed to the transmission case 1, and in the disconnected state, the first connected body Ra-Sd is disconnected from the transmission case 1.

The second brake B2 is an engagement mechanism, which includes a dog clutch or a synchromesh mechanism having a synchronization function, and can be switched between a fixed state and a disconnected state; in the fixed state, the ring gear Rc (seventh element) of the third planetary gear system PGS3 is fixed to the transmission case 1, and in the disengaged state, the ring gear Rc is disconnected from the transmission case 1.

The automatic transmission according to the third embodiment includes a one-way clutch F1, which is adjacent to the second brake B2 and allows normal rotation but prevents reverse rotation of the ring gear Rc (seventh element) of the third planetary gear system PGS3.

The first brake B3 is a wet multi-disc brake and can be switched between a fixed state and a disconnected state; in the fixed state, the carrier Ca (second element) of the first planetary gear system PGS1 is fixed to the transmission case 1, and in the disconnected state, the carrier Ca is disconnected from the transmission case 1.

The clutches C1 to C3 and the brakes B1 to B3 are switched between the different states by a transmission control unit (TCU) (not shown) on the basis of vehicle information, such as traveling speed of the vehicle.

The third planetary gear system PGS3 is disposed radially outward of the second planetary gear system PGS2. The ring gear Rb (sixth element) of the second planetary gear system PGS2 and the sun gear Sc (ninth element) of the third planetary gear system PGS3 are connected to constitute a fourth connected body Rb-Sc. By disposing the third planetary gear system PGS3 radially outward of the second planetary gear system PGS2, the second planetary gear system PGS2 and the third planetary gear system PGS3 overlap each other in the radial direction, reducing the shaft length of the automatic transmission.

To reduce the shaft length, the second planetary gear system PGS2 and the third planetary gear system PGS3 only have to partially overlap with each other in the radial direction. The shaft length can be minimized if the second planetary gear system PGS2 and the third planetary gear system PGS3 completely overlap each other in the radial direction.

The output member 3, which includes an output gear, is interposed between the first planetary gear system PGS1 and the fourth planetary gear system PGS4. The transmission case 1 includes a sidewall 1a, which extends radially inward between the output member 3 and the first planetary gear system PGS1. The sidewall 1a has a cylindrical part 1b, which extends inward of the output member 3 in the radial direction. The output member 3 is supported by the cylindrical part 1b with a bearing in such a manner that the output member 3 rotates. With such a configuration, the output member 3 can be firmly and rotatably supported by a mechanically strong cylindrical part 1b connected to the transmission case 1.

The establishment of each gear of the automatic transmission according to the third embodiment will be described with reference to FIGS. 6 and 7A to 7D.

To establish first gear, the third clutch C3 is set to a connected state, and the first brake B1 is set to a fixed state. By setting the first brake B1 to a fixed state, the rotational speed of the first connected body Ra-Sd is set to zero. By setting the third clutch C3 to a connected state, the carrier Ca (second element) of the first planetary gear system PGS1 and the fourth connected body Rb-Sc are connected and rotate at a same speed. The operation of the one-way clutch F1 causes the rotational speed of the ring gear Rc (seventh element) of the third planetary gear system PGS3 to be set to zero. The rotational speed of the ring gear Rd (tenth element) of the fourth planetary gear system PGS4, which is connected to the output member 3, is set to "1st", as illustrated in FIG. 6, and first gear is established.

In first gear, since the second brake B2 is in a disconnected state, the number of disconnected engagement mechanisms is four. Since the second brake B2 is a meshing mechanism, even when it is in a disengaged state, friction loss is reduced, compared with that of a wet multi-disc brake. Since the operation of the one-way clutch F1 causes the rotational speed of the ring gear Rc (seventh element) of the third planetary gear system PGS3 to be set to zero, friction loss does not occur with the second brake B2, even if the second brake B2 is a wet multi-disc brake. Therefore, the substantial number of disconnected engagement mechanisms in first gear is three.

If the second brake B2 is also set to a fixed state in first gear, engine brake can be applied.

To establish second gear, the third clutch C3 is set to a connected state, and the third brake B3 is set to a fixed state. By setting the third brake B3 to a fixed state, the rotational speed of the carrier Ca (second element) of the first planetary gear system PGS1 is set to zero. By setting the third clutch C3 to a connected state, the rotational speed of the fourth connected body Rb-Sc is set to zero, which is the same rotational speed as the carrier Ca (second element) of the first planetary gear system PGS1. The operation of the one-way clutch F1 causes the rotational speed of the ring gear Rc (seventh element) of the third planetary gear system PGS3 to be set to zero.

Since the rotational speed of the elements Rc and Sc among the seventh to ninth elements Rc, Cc, and Sc of the third planetary gear system PGS3 are both zero, the elements Rc, Cc, and Sc of the third planetary gear system PGS3 are set to a locked state in which relative rotation is prevented, and thus, the rotational speed of the carrier Cc, i.e., second connected body Cc-Cd, is also set to zero. The rotational speed of the ring gear Rd (tenth element) of the fourth planetary gear system PGS4, which is connected to the output member 3, is set to "2nd", as illustrated in FIG. 6, and second gear is established.

In second gear, since the second brake B2 is in a disconnected state, the number of disconnected engagement mechanisms is four. Similar to first gear, friction loss does not occur at the second brake B2. Therefore, the substantial number of disconnected engagement mechanisms in second gear is three.

If the second brake B2 is also set to a fixed state in second gear, engine brake can be applied.

To establish third gear, the second clutch C2 and the third clutch C3 are set to a connected state. By setting the third clutch C3 to a connected state, the carrier Ca (second element) of the first planetary gear system PGS1 and the fourth connected body Rb-Sc are connected and rotate at the same rotational speed. The operation of the one-way clutch F1 causes the rotational speed of the ring gear Rc (seventh element) of the third planetary gear system PGS3 to be set to zero.

By setting the second clutch C2 to a connected state, the rotational speed of the carrier Cb (fifth element) of the second planetary gear system PGS2 is set to zero, which is the same rotational speed as the ring gear Rc (seventh element) of the third planetary gear system PGS3. The rotational speed of the ring gear Rd (tenth element) of the fourth planetary gear system PGS4, which is connected to the output member 3, is set to "3rd", as illustrated in FIG. 6, and third gear is established.

In third gear, since the second brake B2 is in a disconnected state, the number of disconnected engagement mechanisms is four. Similar to first and second gears, friction loss does not occur at the second brake B2. Therefore, the substantial number of disconnected engagement mechanisms in third gear is three.

If the second brake B2 is also set to a fixed state in third gear, engine brake can be applied.

To establish fourth gear, the second clutch C2 and the third clutch C3 are set to a connected state, and the third brake B3 is set to a fixed state. By setting the second clutch C2 to a connected state, the carrier Cb (fifth element) of the second planetary gear system PGS2 and the ring gear Rc (seventh element) of the third planetary gear system PGS3 both rotate at the same rotational speed. By setting the third brake B3 to a fixed state, the rotational speed of the carrier Ca (second element) of the first planetary gear system PGS1 is set to zero.

By setting the third clutch C3 to a connected state, the rotational speed of the fourth connected body Rb-Sc is set to zero, which is the same rotational speed as the carrier Ca (second element) of the first planetary gear system PGS1. The rotational speed of the ring gear Rd (tenth element) of the fourth planetary gear system PGS4, which is connected to the output member 3, is set to "4th", as illustrated in FIG. 6, and fourth gear is established.

To establish fifth gear, the second clutch C2 and the third clutch C3 are set to a connected state, and the first brake B1 is set to a fixed state. By setting the second clutch C2 to a connected state, the carrier Cb (fifth element) of the second planetary gear system PGS2 and the ring gear Rc (seventh element) of the third planetary gear system PGS3 both rotate at the same speed. By setting the third clutch C3 in a connected state, the carrier Ca (second element) of the first planetary gear system PGS1 and the fourth connected body Rb-Sc are connected and rotate at the same speed. By setting the first brake B1 to a fixed state, the rotational speed of the first connected body Ra-Sd is set to zero. The rotational speed of the ring gear Rd (tenth element) of the fourth planetary gear system PGS4, which is connected to the output member 3, is set to "5th", as illustrated in FIG. 6, and fifth gear is established.

To establish sixth gear, the first, second, and third gears C1, C2, and C3 are set to a connected state. By setting the first clutch C1 and the second clutch C2 to a connected state, the sun gear Sb (fourth element) and the carrier Cb (fifth element) of the second planetary gear system PGS2 both rotate at the same rotational speed "1", and the fourth, fifth, and sixth elements Sb, Cb, and Rb of the second planetary gear system PGS2 are set to a locked state in which relative rotation is prevented and rotate at the rotational speed "1". The rotational speed of the ring gear Rc (seventh element) and the sun gear Sc (ninth element) of the third planetary gear system PGS3 is set to "1", and the seventh, eighth, and ninth elements Rc, Cc, and Sc of the third planetary gear system PGS3 are set to a locked state in which relative rotation is prevented and rotate at the rotational speed "1".

By setting the third clutch C3 to a connected state, the carrier Ca (second element) of the first planetary gear system PGS1 and the fourth connected body Rb-Sc rotate at the same speed "1". Thus, the sun gear Sa (first element) and the carrier Ca (second element) of the first planetary gear system PGS1 both rotate at the same rotational speed "1", the elements Sa, Ca, and Ra are set to a locked state in which relative rotation is prevented, and the rotational speed of the ring gear Ra (third element), i.e., first connected body Ra-Sd, is set to "1".

The tenth, eleventh, and twelfth rotary elements Rd, Cd, and Sd of the fourth planetary gear system PGS4 are also set to a locked state in which relative rotation is prevented; the rotational speed of the ring gear Rd (tenth element) of the fourth planetary gear system PGS4, which is connected to the output member 3, is set to "6th", which is the rotational speed "1"; and sixth gear is established.

To establish seventh gear, the first clutch C1 and the third clutch C3 are set to a connected state, and the first brake B1 is set to a fixed state. By setting the first clutch C1 to a connected state, the third connected body Sa-Sb and the ring gear Rc (seventh element) of the third planetary gear system PGS3 both rotate at the same rotational speed "1". By setting the third clutch C3 to a connected state, the carrier Ca (second element) of the first planetary gear system PGS1 and the fourth connected body Rb-Sc both rotate at the same rotational speed.

By setting the first brake B1 to a fixed state, the rotational speed of the first connected body Ra-Sd is set to zero. The rotational speed of the ring gear Rd (tenth element) of the fourth planetary gear system PGS4, which is connected to the output member 3, is set to "7th", as illustrated in FIG. 6, and seventh gear is established.

To establish eighth gear, the first clutch C1 and the second clutch C2 are set to a connected state, and the first brake B1 is set to a fixed state. By setting the first clutch C1 and the second clutch C2 to a connected state, the sun gear Sb (fourth element) and the carrier Cb (fifth element) of the second planetary gear system PGS2 both rotate at the same rotational speed "1", the fourth, fifth, and sixth elements Sb, Cb, and Rb of the second planetary gear system PGS2 are set to a locked state in which relative rotation is prevented and rotate at the rotational speed "1".

The rotational speed of the ring gear Rc (seventh element) and the sun gear Sc (ninth element) of the third planetary gear system PGS3 is set to "1"; the seventh, eighth, and ninth elements Rc, Cc, and Sc of the third planetary gear system PGS3 are set to a locked state in which relative rotation is prevented and rotate at the rotational speed "1"; and the rotational speed of the second connected body Cc-Cd is set to "1".

By setting the first brake B1 to a fixed state, the rotational speed of the first connected body Ra-Sd is set to zero. The rotational speed of the ring gear Rd (tenth element) of the fourth planetary gear system PGS4, which is connected to the output member 3, is set to "8th" ((k+1)/k), as illustrated in FIG. 6, and eighth gear is established.

To establish ninth gear, the first clutch C1 and the second clutch C2 are set to a connected state, and the third brake B3 is set to a fixed state. By setting the first clutch C1 and the second clutch C2 to a connected state, the sun gear Sb (fourth element) and the carrier Cb (fifth element) of the second planetary gear system PGS2 both rotate at the same rotational speed "1"; and the fourth, fifth, and sixth elements Sb, Cb, Rb of the second planetary gear system PGS2 are set to a locked state in which relative rotation is prevented and rotate at the rotational speed "1".

The rotational speed of the ring gear Rc (seventh element) and the sun gear Sc (ninth element) of the third planetary gear system PGS3 is set to "1"; the seventh, eighth, and ninth elements Rc, Cc, and Sc of the third planetary gear system PGS3 are set to a locked state in which relative rotation is prevented and rotate at the rotational speed "1"; and the rotational speed of the second connected body Cc-Cd is set to "1".

By setting the third brake B3 in a fixed state, the rotational speed of the carrier Ca (second element) of the first planetary gear system PGS1 is set to zero. The rotational speed of the ring gear Rd (tenth element) of the fourth planetary gear system PGS4, which is connected to the output member 3, is set to "9th", as illustrated in FIG. 6, and ninth gear is established.

To establish reverse gear, the second clutch C2 is set to a connected state, and the first brake B1 and the second brake B2 are set to a fixed state. By setting the first brake B1 to a fixed state, the rotational speed of the first connected body Ra-Sd is set to zero. By setting the second brake B2 to a fixed state, the rotational speed of the ring gear Rc (seventh element) of the third planetary gear system PGS3 is set to zero. By setting the second clutch C2 to a connected state, the carrier Cb (fifth element) of the second planetary gear system PGS2 and the ring gear Rc (seventh element) of the third planetary gear system PGS3 both set to a rotational speed of zero.

The rotational speed of the ring gear Rd (tenth element) of the fourth planetary gear system PGS4, which is connected to the output member 3, is set to "Rvs" for reverse rotation (rotation in the direction that makes the vehicle move backward) as illustrated in FIG. 6, and reverse gear is established.

The speed line indicated by the dotted line in FIG. 6 indicates that the elements of the planetary gear systems following the planetary gear system that transmits power, among the first to fourth planetary gear system PGS1 to PGS4, are rotating (idling).

FIG. 7A illustrates the states of the clutches C1, C2, and C3, the brakes B1, B2, and B3, and the one-way clutch F1 for each gear, where the circles in the cells in the columns corresponding to the clutches C1, C2, and C3 and the brakes B1, B2, and B3 represent a connected state or a fixed state, and blank cells represent a disconnected state. The circles in the cells in the column corresponding to the one-way clutch F1 represent a state in which the rotational speed of the ring gear Rc (seventh element) of the third planetary gear system PGS3 is set to zero as a result of the operation of the one-way clutch F1.

FIG. 7B illustrates the gear ratio of each gear ((rotational speed of input shaft 2)/(rotational speed of output member 3)), where the gear ratio h of the first planetary gear system PGS1 is 1.879, the gear ratio i of the second planetary gear system PGS2 is 2.227, the gear ratio j of the third planetary gear system PGS3 is 1.773, and the gear ratio k of the fourth planetary gear system PGS4 is 1.794, as shown in FIG. 7D.

Accordingly, the common ratios (ratios of the inter-gear ratios) are set appropriately, as shown in FIG. 7C, and the ratio ranges ((gear ratio of first gear)/(gear ratio of ninth gear)), which are shown in FIG. 7D, are also set appropriately.

With the automatic transmission according to the first embodiment, forward nine-speed is established. In each gear, the number of disconnected wet multi-disc clutches and wet multi-click brakes is three or smaller, and friction loss is reduced, improving transmission efficiency of the driving force.

In a high-speed gear range exceeding seventh gear, which is a middle-speed gear, and including eighth and ninth gears, the third clutch C3, which is constituted of a meshing mechanism having a friction loss smaller than a wet multi-disc clutch, is set to a disconnected state, where seventh gear is defined as a predetermined middle-speed gear, first to seventh gears are defined as a low-speed gear range, and eighth and ninth gears are defined as a high-speed gear range, in the high-speed gear range.

The second brake B2, which is set to a disconnected state in all gears except in reverse gear, is also constituted of a meshing mechanism. Thus, in the high-speed gear range, the number of disconnected wet multi-disc clutches and wet multi-disc is one, reducing friction loss during high-speed operation of the vehicle and improving fuel consumption.

The third clutch C3, which is constituted of a meshing mechanism, is switched between a connected state and a disconnected state between the seventh gear, which is the predetermined middle-speed gear, and the eighth gear. The transmitted torque (transmitted driving force) at the third clutch C3 in seventh gear (predetermined middle-speed gear) is relatively small; thus, even if the third clutch C3 is constituted of a dog clutch, which is an engagement mechanism, switching between a connected state and a disconnected state can be smoothly carried out when the gear is shifted from seventh to eighth gear.

Since all of the planetary gear systems PGS1 to PGS4 are constituted of single-pinion planetary gear systems, the number of gear engagement in the transmission route of the driving force can be reduced, and the transmission efficiency can be improved, compared with a double-pinion planetary gear system including a sun gear, a ring gear, and a carrier, which supports a pair of pinions in such a manner that the pinions freely rotate and orbit, the pinions engaging with each other, one of the pinions engaging with the sun gear, and the other pinion engaging with the ring gear. (A double-pinion planetary gear system is also known as "plus planetary gear system" or "positive planetary gear system" because the sun gear and the ring gear rotate in the same direction when the carrier is fixed. When the ring gear is fixed, the sun gear and the carrier rotate in difference directions).

Since the one-way clutch F1 adjoins the second brake B2, the state of the second brake B2 does not have to be switched when the gear is shifted between third gear and fourth gear, and the gear shift control is improved.

In the third embodiment, the third clutch C3 and the second brake B2 are constituted of meshing mechanisms. Even when they are respectively constituted of a wet multi-disc clutch and a wet multi-disc brake, the number of disconnected wet multi-disc clutches and wet multi-click brakes is three or smaller in each gear, and the advantage of the second aspect of the present invention in which friction loss is reduced is achieved.

The one-way clutch F1 may be omitted. In such a case, the second brake B2 may be set to a fixed state to establish first to third gears. If the one-way clutch F1 is omitted, the second brake B2 may be a two-way clutch, which can be switched between a fixed state and a reverse-rotation prevention state; in the fixed state, the ring gear Rc (seventh element) of the third planetary gear system PGS3 is fixed to the transmission case 1, and in the reverse-rotation prevention state, forward rotation of the ring gear Rc (seventh element) of the third planetary gear system PGS3 is allowed but reverse rotation is prevented. In such a case, the two-way clutch may be may have a configuration illustrated in FIGS. 9A to 9C in the first embodiment and may be operated in the same manner to establish each gear.

In the third embodiment, forward nine-speed gear shift is established. Instead, second, fourth, and ninth gears may be omitted, and forward six-speed gear shift may be established.

Similar to a fourth embodiment described below, the fourth planetary gear system PGS4 may be disposed radially outward of the first planetary gear system PGS1, and the ring gear Ra (third element) of the first planetary gear system PGS1 and the sun gear Sd (twelfth element) of the fourth planetary gear system PGS4, which constitute the first connected body Ra-Sd, may be connected into an integrated body. In this way, the shaft length can be reduced even more.

Fourth Embodiment

Figure 8:
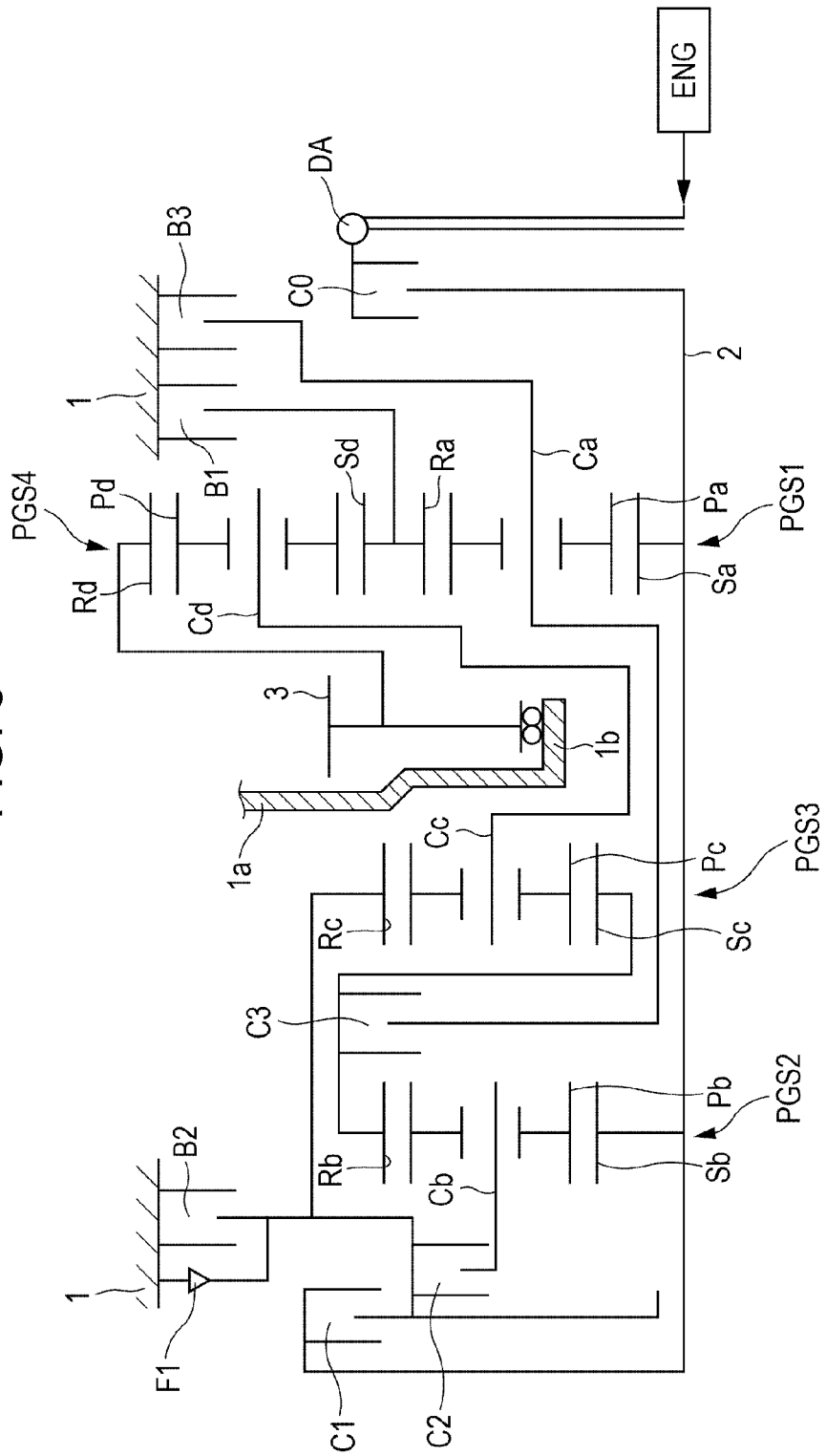
FIG. 8 is a skeleton diagram of the upper half of an automatic transmission according to a fourth embodiment of the second aspect of the present invention.

An automatic transmission according to a fourth embodiment of the second aspect of the present invention will be described with reference to FIG. 8. The automatic transmission according to the fourth embodiment has the same configuration as the automatic transmission according to the third embodiment, and the same gears can be established, except that a damper DA and a single-disc or multi-disc starting clutch C0, which is capable of transmitting a driving force of a driving source ENG to the input shaft 2 by frictional engagement, is disposed, instead of a torque converter; the third planetary gear system PGS3 is interposed between the first planetary gear system PGS1 and the third clutch C3, instead of being disposing radially outward of the second planetary gear system PGS2; the fourth planetary gear system PGS4 is disposed radially outward of the first planetary gear system PGS1; the ring gear Ra (third element) of the first planetary gear system PGS1 and the sun gear Sd (twelfth element) of the fourth planetary gear system PGS4, which constitute the first connected body Ra-Sd, are connected into an integrated body; and the output member 3, which is an output gear, is interposed between the first planetary gear system PGS1 and the third planetary gear system PGS3.

With the automatic transmission according to the fourth embodiment, the same advantages as those of the first embodiment are achieved. As in the third embodiment, in the fourth embodiment, a torque converter may be disposed instead of the starting clutch C0. As in the third embodiment, the third planetary gear system PGS3 may be disposed radially outward of the second planetary gear system PGS2, and the ring gear Rb (sixth element) of the second planetary gear system PGS2 and the sun gear Sc (ninth element) of the third planetary gear system PGS3 may be connected to constitute a fourth connected body Rb-Sc.

An embodiment of the present invention provides an automatic transmission including an input shaft being supported inside a transmission case in a freely rotatable manner and being rotated by power from a driving source; an output member outputting rotation of the input shaft by multiple gear-shifting; first, second, third, and fourth planetary gear systems, each system including three elements, the three elements being a sun gear, a carrier, and a ring gear; and six engagement mechanisms, wherein the elements of the second and third planetary gear systems constitute four rotary elements, the four rotary elements being defined as a first rotary element, a second rotary element, a third rotary element, and a fourth rotary element on the basis of an alignment order in a collinear diagram illustrating ratios of relative rotational speeds of the four rotary elements as straight lines, the three elements of the first planetary gear system are defined as a first element, a second element, and a third element on the basis of an alignment order in accordance with distances corresponding to gear ratios in a collinear diagram illustrating ratios of relative rotational speeds as straight lines, the three elements of the fourth planetary gear system are defined as a fourth, a fifth element, and a sixth element on the basis of an alignment order in accordance with distances corresponding to gear ratios in a collinear diagram, the first element is connected to the input shaft, the fourth element is connected to the output member, the third element and the sixth element are connected to constitute a first connected body, the third rotary element and the fifth element are connected to constitute a second connected body, the six engagement mechanisms constituted of a first clutch connecting the first element and the second rotary element, a second clutch connecting the first element and the first rotary element, a third clutch connecting the second element and the fourth rotary element, a first brake fixing the first connected body to the transmission case, a second brake fixing the second rotary element to the transmission case, and a third brake fixing the second element to the transmission case, and gears are established by connecting or fixing at least three of the six engagement mechanisms.

As apparent from the embodiments described above, according to this automatic transmission, three of the six engagement mechanisms, i.e., three clutches and three brakes, are engaged in each gear to establish a connected state or a fixed state. Consequently, the number of engagement mechanisms disconnected, i.e., not in a connected state or a fixed state, is three in each gear. Therefore, compared with a known automatic transmission in which four of the engagement mechanisms are disconnected in each gear, friction loss due to disconnected engagement mechanisms can be reduced, and the transmission efficiency of the automatic transmission can be improved.

An embodiment of the present invention provides an automatic transmission including an input shaft being supported inside a transmission case in a freely rotatable manner and being rotated by power from a driving source; an output member outputting rotation of the input shaft by multiple gear-shifting; first, second, third, and fourth planetary gear systems, each system including three elements, the three elements being a sun gear, a carrier, and a ring gear; and six engagement mechanisms, wherein the three elements of the first planetary gear system are defined as a first element, a second element, and a third element on the basis of an alignment order in accordance with distances corresponding to gear ratios in a collinear diagram illustrating ratios of relative rotational speeds as straight lines, the three elements of the second planetary gear system are defined as a fourth element, a fifth element, and a sixth element on the basis of an alignment order in accordance with distances corresponding to gear ratios in a collinear diagram illustrating ratios of relative rotational speeds as straight lines, the three elements of the third planetary gear system are defined as a seventh element, an eighth element, and a ninth element on the basis of an alignment order in accordance with distances corresponding to gear ratios in a collinear diagram illustrating ratios of relative rotational speeds as straight lines, the three elements of the fourth planetary gear system are defined as a tenth element, an eleventh element, and a twelfth element on the basis of distances corresponding to gear ratios in a collinear diagram, the third element and the twelfth element are connected to constitute a first connected body, the eighth element and the fourth element are connected to constitute a second connected body, the first element and the fourth element are connected to constitute a third connected body, the sixth element and the ninth element are connected to constitute a fourth connected body, the third connected body is connected to the input shaft, the tenth element is connected to the output member, the six engagement mechanisms constituted of a first clutch connecting the seventh element and the third connected body, a second clutch connecting the fifth element and the seventh element, a third clutch connecting the second element and the fourth connected body, a first brake fixing the first connected body to the transmission case, a second brake fixing the seventh element to the transmission case, and a third brake fixing the second element to the transmission case, and gears are established by connecting or fixing at least three of the six engagement mechanisms.

As apparent from the embodiments described above, according to the automatic transmission, among the six engagement mechanisms, i.e., three clutches and three brakes, the number of engagement mechanisms disconnected, i.e., not in a connected state or a fixed state, is three in each gear; therefore, friction loss due to disconnected engagement mechanisms can be reduced, and the transmission efficiency of the automatic transmission can be improved.

In the automatic transmission, the third planetary gear system may be disposed radially outward of the second planetary gear system, and one of the first to fourth rotary elements or the fourth connected body may be constituted by integrating the sun gear of the third planetary gear system with the ring gear of the second planetary gear system.

With such a configuration, the third planetary gear system is disposed radially outward of the second planetary gear system, and thus, the shaft length of the automatic transmission can be reduced.

In the automatic transmission, the first connected body may be constituted by connecting the ring gear of the first planetary gear system and the sun gear of the fourth planetary gear system; the fourth planetary gear system may be disposed radially outward of the first planetary gear system; and the sun gear of the fourth planetary gear system may be integrated with the ring gear of the first planetary gear system.

With such a configuration, the fourth planetary gear system is disposed radially outward of the first planetary gear system, and thus, the shaft length of the automatic transmission can be reduced.

In the automatic transmission, it is preferable that the third clutch be constituted of a meshing mechanism. Compared with a wet multi-disc clutch that is frictionally engaged, the meshing mechanism reduces friction loss even when in a disconnected state. Therefore, with the above-described configuration, friction loss can be reduced even more.

In the automatic transmission, it is preferable that the second brake be constituted of a meshing mechanism. Accordingly, friction lass can be reduced at the second brake, and the friction loss of the entire automatic transmission can be reduced even more.

In the automatic transmission, it is preferable that a one-way clutch allowing forward rotation of the second rotary element or the seventh element and prevents reverser rotation be included. In this way, as apparent from the embodiments described below, the fastening force of the second brake can be small; friction loss at the second brake can be reduced; and thus, gear shift control of the automatic transmission can be improved.

In the automatic transmission, the second brake may be constituted of a two-way clutch configured to switch between a fixed state and a reverse-rotation prevention state, in the fixed state, the second rotary element or the seventh element is fixed to the transmission case, and in the reverse-rotation prevention state, forward rotation of the second rotary element or the seventh element is allowed and reverse rotation is prevented. In this way, also, friction loss can be reduced, and gear shift control of the automatic transmission can be improved.

In the automatic transmission, it is preferable that the first to fourth planetary gear systems each be constituted of a single-pinion planetary gear system including a sun gear, a ring gear, and a carrier supporting a pinion engaged with the sun gear and the ring gear in a freely orbitable and rotatable manner (the first planetary gear system PGS1 is also known as "minus planetary gear system" or "negative planetary gear system" because, when the carrier Ca is fixed, the sun gear Sa and the ring gear Ra rotate in different directions; and when the ring gear Ra is fixed, the sun gear Sa and the carrier Ca rotate in the same direction).

Accordingly, the planetary gear systems are constituted of single-pinion planetary gear systems, the number of gear engagement in the transmission route of the driving force from the input shaft to the output member can be reduced, and the transmission efficiency can be improved, compared with a double-pinion planetary gear system including a sun gear, a ring gear, and a carrier, which supports a pair of pinions in such a manner that the pinions freely rotate and orbit, the pinions engaging with each other, one of the pinions engaging with the sun gear, and the other pinion engaging with the ring gear. (A double-pinion planetary gear system is also known as "plus planetary gear system" or "positive planetary gear system" because the sun gear and the ring gear rotate in the same direction when the carrier is fixed. When the ring gear is fixed, the sun gear and the carrier rotate in difference directions).

In the automatic transmission, a starting clutch configured to transmit power from the driving source to the input shaft may be included.

In the automatic transmission, the power of the driving source may be transmitted to the input shaft via a torque converter.

Obviously, numerous modifications and variations of the present invention are possible in light of the above teachings. It is therefore to be understood that within the scope of the appended claims, the invention may be practiced otherwise than as specifically described herein.

What is claimed is:
1. An automatic transmission comprising:
an input shaft rotatably arranged relative to a transmission case and configured to be rotated with power of a driving source relative to the transmission case;
an output member to output rotation of the input shaft using multiple gear-shifting;
a first planetary gear system including a first sun gear, a first carrier, and a first ring gear;
a second planetary gear system including a second sun gear, a second carrier, and a second ring gear;
a third planetary gear system including a third sun gear, a third carrier, and a third ring gear;
a fourth planetary gear system including a fourth sun gear, a fourth carrier, and a fourth ring gear;
an engagement mechanism;
four elements of either the second sun gear, the second carrier, the second ring gear, the third sun gear, the third carrier, or the third ring gear being defined as a first rotary element, a second rotary element, a third rotary element, and a fourth rotary element;

the first sun gear, the first carrier, and the first ring gear being defined as a first element, a second element, and a third element;

the fourth ring gear, the fourth carrier, and the fourth sun gear being defined as a fourth element, a fifth element, and a sixth element;

the first element being connected to the input shaft;

the fourth element being connected to the output member;

the third element and the sixth element being connected to each other to provide a first connected body;

the third rotary element and the fifth element being connected to each other to provide a second connected body; and the engagement mechanism comprising:
  a first clutch configured to releasably connect the first element to the second rotary element;
  a second clutch configured to releasably connect the first element to the first rotary element;
  a third clutch configured to releasably connect the second element to the fourth rotary element;
  a first brake configured to releasably connect the first connected body to the transmission case;
  a second brake configured to releasably connect the second rotary element to the transmission case; and
  a third brake configured to releasably connect the second element to the transmission case; and the multiple gear-shifting being provided by setting at least three of the first to third clutches and the first to third brakes in a connection state.

2. The automatic transmission according to claim 1, wherein
  the third planetary gear system is disposed radially outward of the second planetary gear system, and
  a third connected body is provided by integrating the third sun gear of the third planetary gear system with the second ring gear of the second planetary gear system.

3. The automatic transmission according to claim 1, wherein
  the first connected body is provided by connecting the first ring gear of the first planetary gear system to the fourth sun gear of the fourth planetary gear system,
  the fourth planetary gear system is disposed radially outward of the first planetary gear system, and
  the fourth sun gear of the fourth planetary gear system is integrated with the first ring gear of the first planetary gear system.

4. The automatic transmission according to claim 1, wherein the third clutch comprises a meshing mechanism.

5. The automatic transmission according to claim 1, wherein the second brake comprises a meshing mechanism.

6. The automatic transmission according to claim 1, further comprising:
  a one-way clutch configured to allow the second rotary element to rotate only in a forward rotation direction relative to the transmission case.

7. The automatic transmission according to claim 1, wherein
  the second brake comprises a two-way clutch configured to switch the second brake between a fixed state and a reverse-rotation prevention state,
  in the fixed state, one of the second rotary element and the seventh element is connected to the transmission case, and
  in the reverse-rotation prevention state, the two-way clutch allows one of the second rotary element and the seventh element to rotate only in a forward rotation direction relative to the transmission case.

8. The automatic transmission according to claim 1, wherein
  the first to fourth planetary gear systems each comprises a single-pinion planetary gear system,
  the first planetary gear system further includes a first pinion gear supported by the first carrier and engaged with the first sun gear and the first ring gear in a freely orbitable and rotatable manner,
  the second planetary gear system further includes a second pinion gear supported by the second carrier and engaged with the second sun gear and the second ring gear in a freely orbitable and rotatable manner,
  the third planetary gear system further includes a third pinion gear supported by the third carrier and engaged with the third sun gear and the third ring gear in a freely orbitable and rotatable manner, and
  the fourth planetary gear system further includes a fourth pinion gear supported by the fourth carrier and engaged with the fourth sun gear and the fourth ring gear in a freely orbitable and rotatable manner.

9. The automatic transmission according to claim 1, further comprising:
  a starting clutch configured to transmit the power of the driving source to the input shaft.

10. The automatic transmission according to claim 1, wherein
  the power of the driving source is transmitted to the input shaft via a torque converter.

* * * * *